United States Patent
Peters et al.

(10) Patent No.: US 9,808,886 B2
(45) Date of Patent: Nov. 7, 2017

(54) METHOD AND SYSTEM FOR ADDITIVE MANUFACTURING USING HIGH ENERGY SOURCE AND HOT-WIRE

(71) Applicant: LINCOLN GLOBAL, INC., City of Industry, CA (US)

(72) Inventors: Steven R Peters, Huntsburg, OH (US); Paul E Denney, Bay Village, OH (US); Badri Narayanan, Highland Heights, OH (US); Dionysus Damato, Incline Village, NV (US); Michael Whitehead, Strongsville, OH (US)

(73) Assignee: Lincoln Global, Inc., City of Industry, CA (US)

( * ) Notice: Subject to any disclaimer, the term of this patent is extended or adjusted under 35 U.S.C. 154(b) by 463 days.

(21) Appl. No.: 14/665,864

(22) Filed: Mar. 23, 2015

(65) Prior Publication Data

US 2015/0209908 A1   Jul. 30, 2015

Related U.S. Application Data

(63) Continuation-in-part of application No. 14/163,367, filed on Jan. 24, 2014.

(51) Int. Cl.
*B23K 26/14* (2014.01)
*B23K 9/10* (2006.01)
(Continued)

(52) U.S. Cl.
CPC ........ *B23K 26/1423* (2013.01); *B23K 9/1093* (2013.01); *B23K 9/124* (2013.01); *B23K 9/173* (2013.01); *B23K 15/0046* (2013.01); *B23K 26/14* (2013.01); *B23K 26/211* (2015.10); *B23K 26/32* (2013.01); *B23K 26/34* (2013.01); *B23K 26/342* (2015.10); *B23K 35/0261* (2013.01); *B23K 2203/04* (2013.01); *B23K 2203/05* (2015.10); *B23K 2203/08* (2013.01);
(Continued)

(58) Field of Classification Search
CPC .......... B23K 9/02; B23K 10/00; B23K 15/00; B23K 15/0086; B23K 26/24; B23K 26/34; B23K 26/342
USPC ............ 219/121.11, 121.13, 121.14, 121.63, 219/121.64, 76.1
See application file for complete search history.

(56) References Cited

U.S. PATENT DOCUMENTS

| | | | |
|---|---|---|---|
| 2002/0117485 A1* | 8/2002 | Jones | B23K 1/0018 219/121.64 |
| 2010/0270274 A1* | 10/2010 | Taminger | B23K 15/02 219/121.17 |
| 2013/0327749 A1 | 12/2013 | Denney et al. | |
| 2014/0021183 A1 | 1/2014 | Peters | |

FOREIGN PATENT DOCUMENTS

JP   59016680   1/1984

OTHER PUBLICATIONS

International Search Report and Written Opinion for PCT/IB2015/000046, Applicant: Lincoln Global, Inc., dated Jul. 10, 2015, 12 pages.

(Continued)

*Primary Examiner* — Samuel M Heinrich
(74) *Attorney, Agent, or Firm* — Perkins Coie, LLP.

(57) ABSTRACT

A method and system to manufacture workpieces employing a high intensity energy source to create a puddle and at least one resistively heated wire which is heated to at or near its melting temperature and deposited into the puddle as droplets.

22 Claims, 23 Drawing Sheets

(51) Int. Cl.
   *B23K 35/02*   (2006.01)
   *B23K 9/12*    (2006.01)
   *B23K 9/173*   (2006.01)
   *B23K 26/34*   (2014.01)
   *B23K 15/00*   (2006.01)
   *B23K 26/32*   (2014.01)
   *B23K 26/342*  (2014.01)
   *B23K 26/211*  (2014.01)
   *B33Y 30/00*   (2015.01)
   *B33Y 10/00*   (2015.01)
   *B23K 103/04*  (2006.01)
   *B23K 103/08*  (2006.01)
   *B23K 103/00*  (2006.01)
   *B23K 103/10*  (2006.01)
   *B23K 103/12*  (2006.01)

(52) U.S. Cl.
   CPC ...... *B23K 2203/10* (2013.01); *B23K 2203/12* (2013.01); *B23K 2203/50* (2015.10); *B23K 2203/52* (2015.10); *B33Y 10/00* (2014.12); *B33Y 30/00* (2014.12)

(56) References Cited

OTHER PUBLICATIONS

U.S. Appl. No. 14/163,367, filed Jan. 24, 2014.
U.S. Appl. No. 14/504,499, filed Oct. 2, 2014.
U.S. Appl. No. 14/665,732, filed Mar. 23, 2015.
U.S. Appl. No. 14/665,769, filed Mar. 23, 2015.
U.S. Appl. No. 14/665,795, filed Mar. 23, 2015.
U.S. Appl. No. 14/665,823, filed Mar. 23, 2015.

* cited by examiner

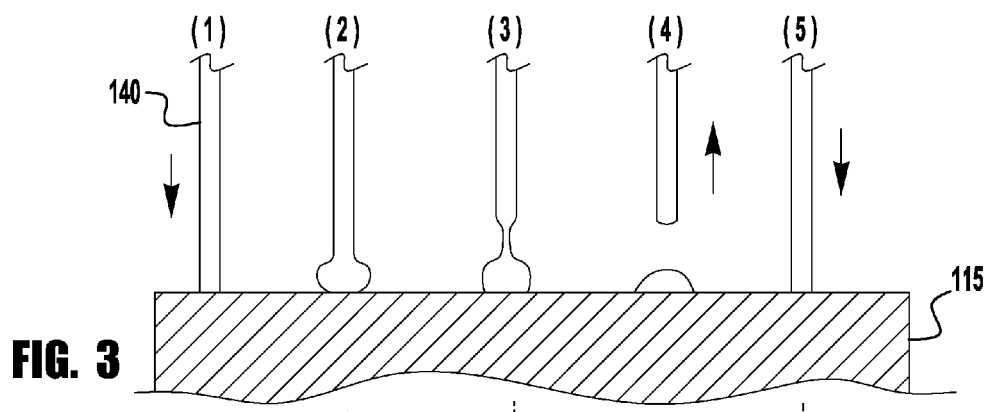
FIG. 3
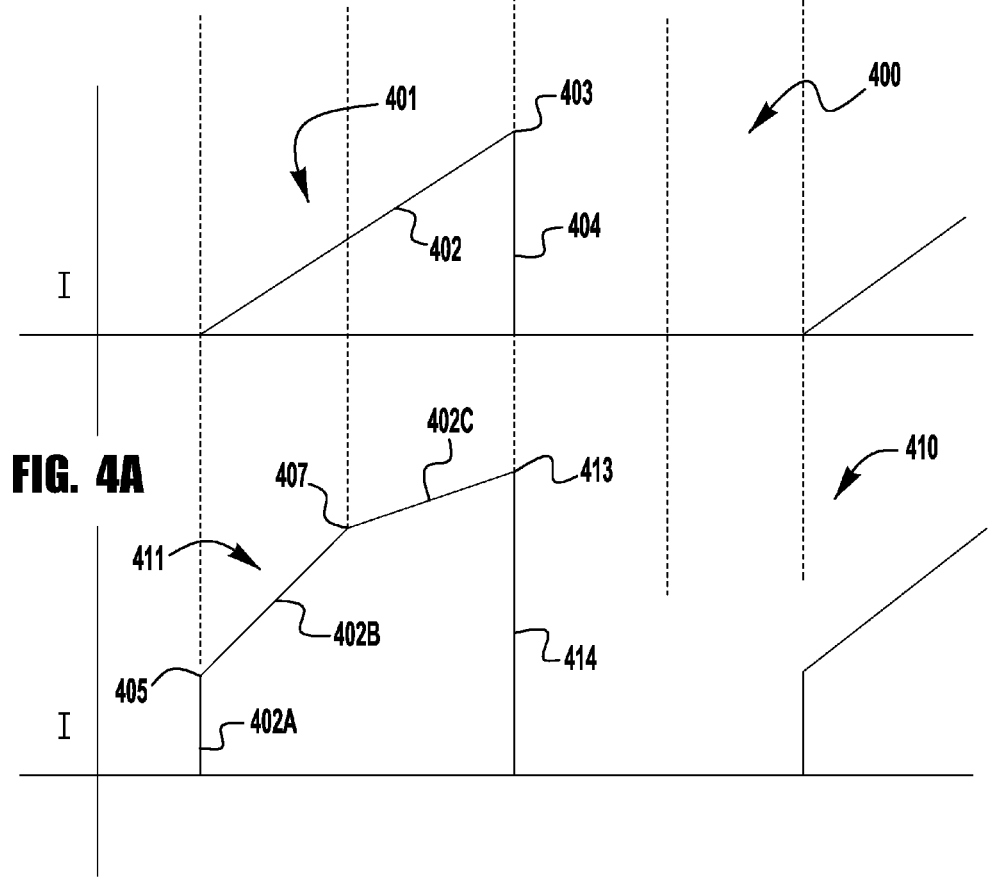
FIG. 4A
FIG. 4B

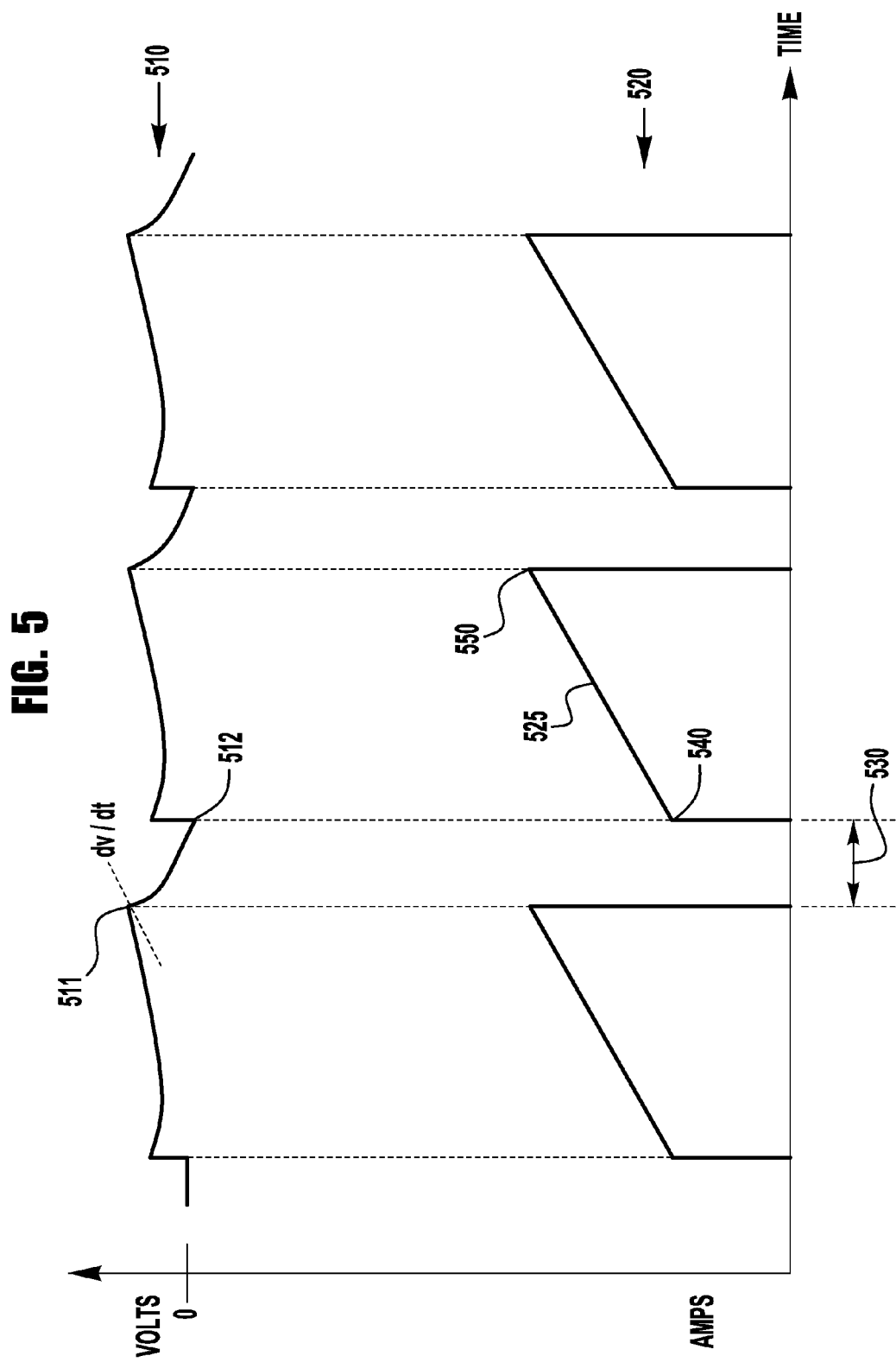

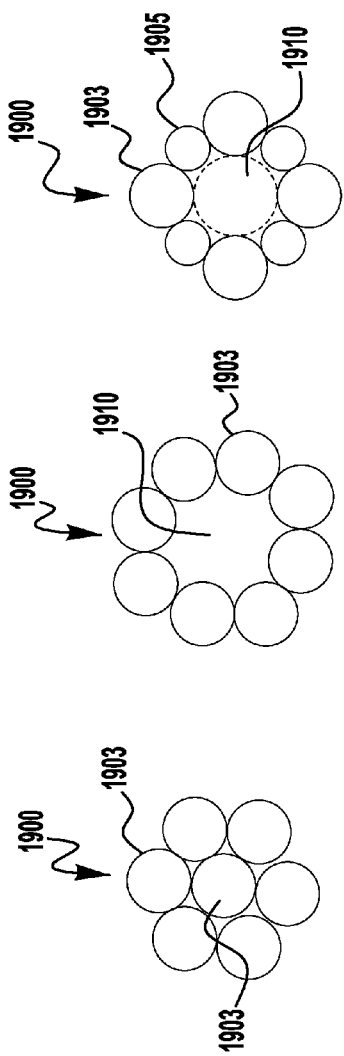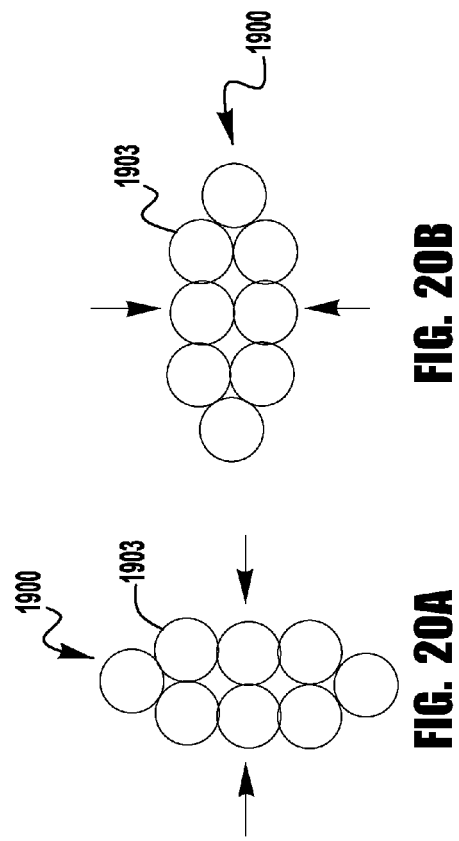

US 9,808,886 B2

METHOD AND SYSTEM FOR ADDITIVE MANUFACTURING USING HIGH ENERGY SOURCE AND HOT-WIRE

PRIORITY

The present application is a continuation in part of, and claims priority to, U.S. patent application Ser. No. 14/163,367 filed on Jan. 24, 2014, which is incorporated herein by reference in its entirety.

TECHNICAL FIELD

Certain embodiments relate to additive manufacturing applications. More particularly, certain embodiments relate to a system and method to use a combination filler wire feed and energy source system for additive manufacturing applications.

BACKGROUND

The use of additive manufacturing has grown recently using various methods. However, known methods have various disadvantages. For example, some processes use metal powders which are generally slow and can result in a fair amount of waste of the powders. Other methods, which use arc based systems, are also slow and do not permit for the manufacture of highly precise articles of manufacture. Therefore, there is a need for additive manufacturing processes and systems which can operate a high speeds, with a high level of precision.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention comprise a system and method for additive manufacturing where a high energy device irradiates a surface of a work piece with a high energy discharge to create a molten puddle on a surface of the work piece. A wire feeding device feeds a wire to the puddle, and a power supply supplies a heating signal to the wire where the heating signal comprises a plurality of current pulses and where each of the current pulses creates a molten droplet on a distal end of the wire which is deposited into the puddle. Each of the current pulses reaches a peak current level after the wire feeder causes the distal end of the wire to contact said puddle and the heating signal has no current in between the plurality of the current pulses. The wire feeder controls the movement of the wire such that the distal end of the wire is not in contact with the puddle between subsequent peak current levels of the current pulses, and the power supply controls the heating current such that no arc is created between the wire and the work piece during the current pulses.

BRIEF DESCRIPTION OF THE DRAWINGS

The above and/or other aspects of the invention will be more apparent by describing in detail exemplary embodiments of the invention with reference to the accompanying drawings, in which:

FIG. 3 illustrates another view of a droplet deposition process in accordance with an exemplary embodiment of the present invention;

FIGS. 4A to 4B illustrate representative current waveforms that can be used with embodiments of the present invention;

FIG. 5 illustrates a representative embodiment of a voltage and current waveform of the present invention;

FIGS. 19A to 19C illustrate exemplary embodiments of braided additive manufacturing consumables that can be used with systems described herein;

FIGS. 20A to 20B illustrate an exemplary braided consumable that has been deformed in accordance with embodiments of the present invention;

DETAILED DESCRIPTION

Figure 1:
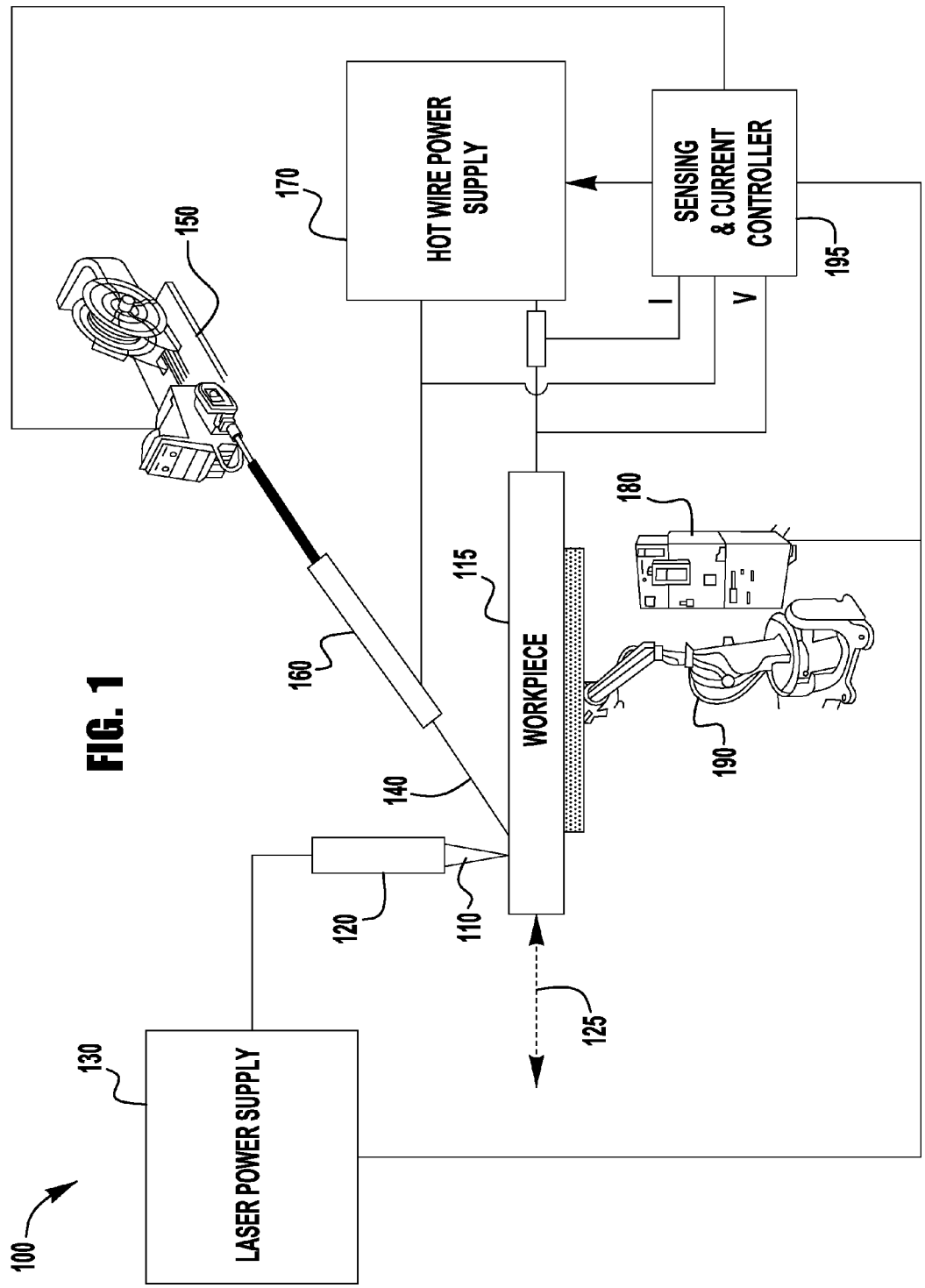
FIG. 1 illustrates a schematic block diagram of an exemplary embodiment of an additive manufacturing system of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

The term "additive manufacturing" is used herein in a broad manner and may refer to any applications including building up, constructing, or creating objects or components.

FIG. 1 illustrates a functional schematic block diagram of an exemplary embodiment of a combination filler wire feeder and energy source system 100 for performing additive manufacturing. The system 100 includes a laser subsystem capable of focusing a laser beam 110 onto a workpiece 115 to heat the workpiece 115. The laser subsystem is a high intensity energy source. The laser subsystem can be any type of high energy laser source, including but not limited to carbon dioxide, Nd:YAG, Yb-disk, YB-fiber, fiber delivered or direct diode laser systems. Other embodiments of the system may include at least one of an electron beam, a plasma arc welding subsystem, a gas tungsten arc welding subsystem, a gas metal arc welding subsystem, a flux cored arc welding subsystem, and a submerged arc welding subsystem serving as the high intensity energy source. The following specification will repeatedly refer to the laser system, beam and power supply, however, it should be understood that this reference is exemplary as any high intensity energy source may be used. For example, a high intensity energy source can provide at least 500 W/cm$^2$. The laser subsystem includes a laser device 120 and a laser power supply 130 operatively connected to each other. The laser power supply 130 provides power to operate the laser device 120.

The system 100 also includes a hot filler wire feeder subsystem capable of providing at least one resistive filler wire 140 to make contact with the workpiece 115 in the vicinity of the laser beam 110. Of course, it is understood that by reference to the workpiece 115 herein, the molten puddle is considered part of the workpiece 115, thus reference to contact with the workpiece 115 includes contact with the puddle. The wire feeder subsystem includes a filler wire feeder 150, a contact tube 160, and a power supply 170. During operation, the filler wire 140 is resistance-heated by electrical current from the power supply 170 which is operatively connected between the contact tube 160 and the workpiece 115. In accordance with an embodiment of the present invention, the power supply 170 is a pulsed direct current (DC) power supply, although alternating current (AC) or other types of power supplies are possible as well. The wire 140 is fed from the filler wire feeder 150 through the contact tube 160 toward the workpiece 115 and extends beyond the tube 160. The extension portion of the wire 140 is resistance-heated such that the extension portion approaches or reaches the melting point before contacting a puddle on the workpiece. The laser beam 110 serves to melt some of the base metal of the workpiece 115 to form a puddle and can also be used to melt the wire 140 onto the workpiece 115. The power supply 170 provides energy needed to resistance-melt the filler wire 140. As will be explained further below, in some embodiments the power supply 170 provides all of the energy needed while in other embodiments the laser or other high energy heat source can provide some of the energy. The feeder subsystem may be capable of simultaneously providing one or more wires, in accordance with certain other embodiments of the present invention. This will be discussed more fully below.

The system 100 further includes a motion control subsystem capable of moving the laser beam 110 (energy source) and the resistive filler wire 140 in a same direction 125 along the workpiece 115 (at least in a relative sense) such that the laser beam 110 and the resistive filler wire 140 remain in a fixed relation to each other. According to various embodiments, the relative motion between the workpiece 115 and the laser/wire combination may be achieved by actually moving the workpiece 115 or by moving the laser device 120 and the wire feeder subsystem. In FIG. 1, the motion control subsystem includes a motion controller 180 operatively connected to a robot 190. The motion controller 180 controls the motion of the robot 190. The robot 190 is operatively connected (e.g., mechanically secured) to the workpiece 115 to move the workpiece 115 in the direction 125 such that the laser beam 110 and the wire 140 effectively travel along the workpiece 115. In accordance with an alternative embodiment of the present invention, the laser device 110 and the contact tube 160 may be integrated into a single head. The head may be moved along the workpiece 115 via a motion control subsystem operatively connected to the head.

In general, there are several methods that a high intensity energy source/wire may be moved relative to a workpiece. If the workpiece is round, for example, the high intensity energy source/wire may be stationary and the workpiece may be rotated under the high intensity energy source/wire. Alternatively, a robot arm or linear tractor may move parallel to the round workpiece and, as the workpiece is rotated, the high intensity energy source/wire may move continuously or index once per revolution to, for example, overlay the surface of the round workpiece. If the workpiece is flat or at least not round, the workpiece may be moved under the high intensity energy source/wire as shown if FIG. 1. However, a robot arm or linear tractor or even a beam-mounted carriage may be used to move a high intensity energy source/wire head relative to the workpiece.

The system 100 further includes a sensing and current control subsystem 195 which is operatively connected to the workpiece 115 and the contact tube 160 (i.e., effectively connected to the output of the power supply 170) and is capable of measuring a potential difference (i.e., a voltage V) between and a current (I) through the workpiece 115 and the wire 140. The sensing and current control subsystem 195 may further be capable of calculating a resistance value (R=V/I) and/or a power value (P=V*I) from the measured voltage and current. In general, when the wire 140 is in contact with the workpiece 115, the potential difference between the wire 140 and the workpiece 115 is zero volts or very nearly zero volts. As a result, the sensing and current control subsystem 195 is capable of sensing when the resistive filler wire 140 is in contact with the workpiece 115 and is operatively connected to the power supply 170 to be further capable of controlling the flow of current through the resistive filler wire 140 in response to the sensing, as is described in more detail later herein. In accordance with another embodiment of the present invention, the sensing and current controller 195 may be an integral part of the power supply 170.

In accordance with an embodiment of the present invention, the motion controller 180 may further be operatively connected to the laser power supply 130 and/or the sensing and current controller 195. In this manner, the motion controller 180 and the laser power supply 130 may communicate with each other such that the laser power supply 130 knows when the workpiece 115 is moving and such that the motion controller 180 knows if the laser device 120 is active. Similarly, in this manner, the motion controller 180 and the sensing and current controller 195 may communicate with each other such that the sensing and current controller 195 knows when the workpiece 115 is moving and such that the motion controller 180 knows if the filler wire feeder subsystem is active. Such communications may be used to coordinate activities between the various subsystems of the system 100.

As is generally known, additive manufacturing is a process in which a material is deposited onto a workpiece so as to create desired manufactured product. In some applications the article of manufacture can be quite complex. However, known methods and systems used for additive manufacturing tend to be slow and have limited performance. Embodiments of the present invention address those areas by providing a high speed and highly accurate additive manufacturing method and system.

Figure 2A:
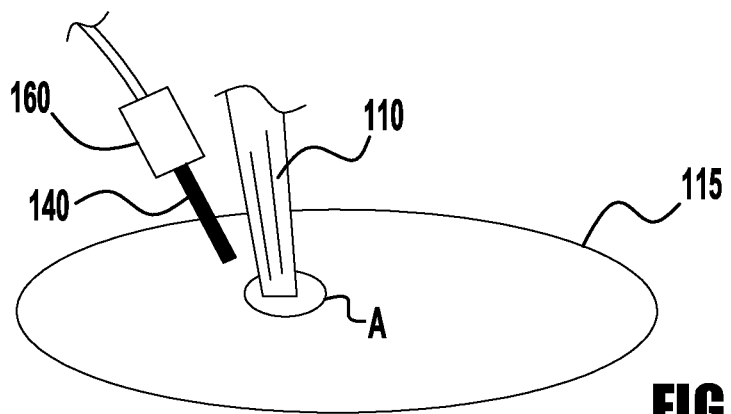
FIGS. 2A to 2D illustrate a droplet deposition process in accordance with an exemplary embodiment of the present invention.
Figure 2B:
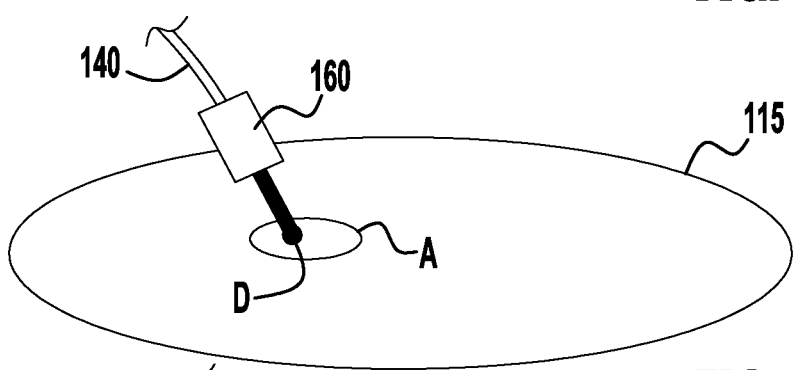
Figure 2C:
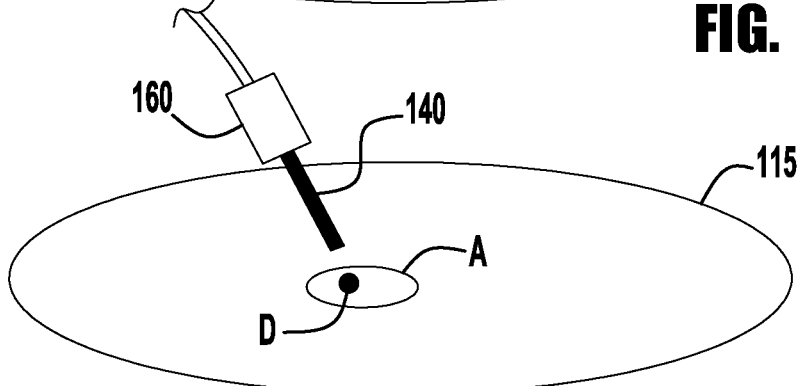
Figure 2D:
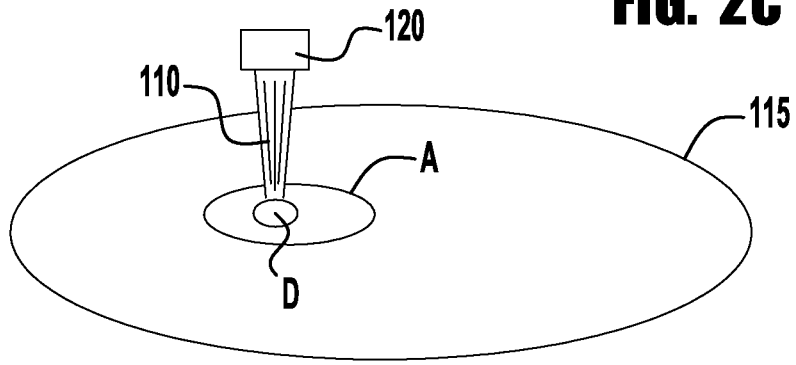

The system 100 depicted in FIG. 1 is such an exemplary system, where the wire 140 is repeatedly melted, in droplets, and deposited onto the workpiece to create the desired shape. This process is exemplary depicted in FIGS. 2A-2D. As shown in these figures. As shown in FIG. 2A a surface of the workpiece is irradiated by the laser beam 110 (or other heat source) while the wire 140 is not in contact with the workpiece. The beam 110 creates a molten puddle A on the surface of the workpiece. In most applications the puddle A has a small area and the level of penetration is not that which would be required for other operations, such as welding or joining. Rather, the puddle A is created so as to prepare the surface of the workpiece to receive and cause sufficient bonding with a droplet from the wire 140. Thus, the beam density of the beam 110 is to be such that only a small puddle is created on the workpiece, without causing too much heat input into the workpiece or to create too large of a puddle. Upon creation of the puddle, a droplet D is formed on the distal end of the wire 140 as the wire is advanced to the puddle A so as to make contact with the puddle A, see FIG. 2B. After contact, the droplet D is deposited onto the puddle A and workpiece (see FIG. 2C). This process is repeated so as to create a desired workpiece. In FIG. 2D an optional step is shown in which the beam 110 is directed at the deposited droplet D after it is separated from the wire 140. In such embodiments, the beam 110 can be used to smooth the workpiece surface and/or add additional heat to allow the droplet D to be fully integrated to the workpiece. Further, the beam can be used to provide additional shaping of the workpiece.

FIG. 3 depicts an exemplary deposition process of the droplet D from the wire 140. The image on the left edge of FIG. 3 depicts the wire 140 making contact with the workpiece. This contact is detected by the power supply 170, which then provides a heating current to the wire 140 so as to heat the wire to at or near a melting temperature for the wire 140. The detection circuit used to detect contact between the workpiece and the wire 140 can be constructed and operate like known detection circuits used in welding power supplies, and therefore a detailed explanation of the circuit's operation and structure need not be provided herein. The heating current from the power supply 170 is ramped up very quickly to provide the necessary energy to melt the droplet D from the end of the wire 140. However, the current is controlled carefully so that no arc is created between the wire 140 and the workpiece. The creation of an arc could prove to be destructive to the workpiece and is thus undesirable. Thus, the current is be controlled in such a way (explained further below) so as to prevent the formation of an arc.

Turning back to FIG. 3, the wire 140 makes contact with the workpiece and the power supply 170 provides a melting current (1). In some exemplary embodiments, an open circuit voltage OCV can be applied to the wire 140 prior to contact. After contact the current is ramped up quickly so to melt the end of the wire 140 to create a droplet D to be deposited (2). The current also causes the wire 140 to neck down just above the droplet D so as to allow for the separation of the droplet D from the wire 140 (3). However, the current is controlled such that while the wire 140 is necking down the current is either turned off or greatly reduced so that when the wire 140 separates from the droplet D no arc is created between the wire 140 and the workpiece (4). In some exemplary embodiments, the wire 140 can be retracted away from the workpiece during and just prior to the breaking of the connection between the droplet D and the wire 140. Because the droplet D is in contact with the puddle the surface tension of the puddle will aid in breaking the droplet away from the wire 140. Once the droplet has been separated from the wire 140, the wire 140 is advanced to repeat the process to deposit another droplet. The wire 140 can be advanced at the same positioned and/or the next droplet can be deposited at any desired location.

As discussed previously, the laser beam 110 can also be utilized after the droplet D has been deposited on the workpiece to smooth or otherwise shape the workpiece after deposition. Furthermore, the beam 110 can further be utilized during the deposition process. That is, in some exemplary embodiments the beam 110 can be used to add heat to the wire 140 to aid in causing the formation of the droplet and/or the separation from the droplet D from the wire 140. This will be discussed further below.

Turning now to FIGS. 4A and 4B, each depict exemplary current waveforms that can be utilized with exemplary embodiments of the present invention. In FIG. 4A, as can be seen, the waveform 400 has a plurality of pulses 401, where each pulse represents the transfer of a droplet D from the wire 140. A current pulse 401 is started at the time the wire 140 makes contact. The current is then increased using a ramp up portion 402 to a peak current level 401 which occurs just before the separation between the wire 140 and the droplet D. In this embodiment, during the ramp up portion 402 the current continually increases to cause the droplet to be formed and the necking down to occur in the wire before separation. Before separation of the droplet D the current is rapidly decreased during a ramp down portion 404 so that when separation occurs no arc is created. In the waveform 400 of FIG. 4A the current is shut off and drops to zero. However, in other exemplary embodiments of the present invention, the current can be dropped to a lower separation level and need not be shut off completely until the separation occurs. In such embodiments, the lower separation current level will continue to add heat to the wire 140 thus aiding in the breaking off of the droplet D.

FIG. 4B depicts another exemplary embodiment of a current waveform 410. However, in this embodiment, the pulses 411 have a ramp up portion 402 which utilizes a plurality of different ramp rate sections—as shown. In the embodiment shown, the ramp up portion 402 utilizes three different ramp rates 402A, 402B and 402C prior separation of the droplet D. The first ramp rate 402A is a very steep and rapid current increase so as to quickly heat the wire 140 so as to start the melting process as soon as possible. After the current reaches a first level 405, the current ramp rate is changed to a second ramp rate 402B which is less than the first ramp rate. In some exemplary embodiments, the first current level is in the range of 35 to 60% of the peak current level 413 for the pulse. The ramp rate 402B is less than the initial ramp rate 402A so as to aid in the control of the current and prevent the formation of an arc, or microarcs. In the embodiment shown the second ramp rate is maintained until the droplet D begins to form at the distal end of the wire 140. In the embodiment shown, once the droplet D starts to form the current ramp rate is changed again to a third ramp rate 402C which is less than the second ramp rate 402B. Again, the decrease in the ramp rate is to allow for added control of the current so as to prevent the inadvertent creation of an arc. If the current was increasing too rapidly it can be difficult (because of various issues such as system inductance) to rapidly decrease the current when separation is detected and prevent the creation of an arc. In some exemplary embodiments, the transition point 407 between the second and third ramp rates is in the range of 50 to 80% of the peak current level 413 of the pulse 411. Like the pulses in FIG. 4A, the current is significantly reduced when the separation of the droplet is detected, which will be explained more fully below. It should also be noted that other embodiments of the present invention can use different ramp rate profiles without departing from the scope or spirit of the present invention. For example, the pulses can have two different ramp rate sections or can have more than three. Furthermore, the pulses can utilize a ramp up which is constantly changing. For example, the current can follow an inverse parabolic curve to the peak current level, or can utilize a combination of different configurations, where a constant ramp rate is used from wire contact to the first current level 405 and then an inverse parabolic curve can be used from that point.

As explained herein, the peak current levels of the pulses 401/411 is to be below an arc generation level, but sufficient to melt off the droplet D during each pulse. Exemplary embodiments of the present invention can utilize different control methodologies for the peak current level. In some exemplary embodiments, the peak current level can be a peak current threshold that is determined by various user input parameters that are input prior to the additive operation. Such parameters include, wire material type, wire diameter, wire type (cored v. solid) and droplets-per-inch (DPI). Of course, other parameters can also be utilized. Upon receiving this input information, the power supply 170 and/or the controller 195 can utilize various control methodologies, such as a look-up table, and determine a peak current value for the operation. Alternatively, the power supply 170 can monitor the output current, voltage, and/or power from the power supply 170 to determine when the separation will occur and control the current accordingly. For example, dv/dt, di/dt and/or dp/dt can be monitored (using a premonition circuit, or the like) and when separation is determined to occur the current is turned off or reduced. This will be explained in more detail below.

The following is a discussion of the use and operation of exemplary embodiments of the present invention. At the beginning of an additive manufacturing process the power supply 170 can apply a sensing voltage between the wire 140 and a workpiece 115 via the power source 170. The sensing voltage may be applied by the power supply 170 under the command of the sensing and current controller 195. In some embodiments, the applied sensing voltage does not provide enough energy to significantly heat the wire 140. With the sensing voltage being applied, the distal end of the wire 140 is advanced toward the workpiece 115. The laser 120 then emits a beam 110 to heat the surface of the workpiece 115 and create a puddle to receive the wire 140. The advancing is performed by the wire feeder 150 and the contact with the workpiece is sensed when the distal end of the wire 140 first makes contact with the workpiece 115. For example, the controller 195 may command the power supply 170 to provide a very low level of current (e.g., 3 to 5 amps) through the wire 140. The sensing may be accomplished by the sensing and current controller 195 measuring a potential difference of about zero volts (e.g., 0.4V) between the wire 140 (e.g., via the contact tube 160) and the workpiece 115. When the distal end of the filler wire 140 is shorted to the workpiece 115 (i.e., makes contact with the workpiece), a significant voltage level (above zero volts) may not exist between the filler wire 140 and the workpiece 115.

After contact, the power source 170 can be turned off over a defined time interval (e.g., several milliseconds) in response to the sensing. Then the power source 170 can be turned back on at the end of the defined time interval to apply a flow of heating current through the wire 140. Also, after contact is sensed the beam 110 can be turned off so as to not add too much heat to the puddle or the workpiece 115. In some embodiments the laser beam 110 can stay on to aid in the heating and separation of the droplet D. This will be discussed in more detail below.

In some exemplary embodiments of the present invention, the process can include stopping the advancing of the wire 140 in response to the sensing, restarting the advancing (i.e., re-advancing) of the wire 140 at the end of the defined time interval, and verifying that the distal end of the filler wire 140 is still in contact with the workpiece 115 before applying the flow of heating current, or after the heating current is being applied and the droplet D is being formed. The sensing and current controller 195 may command the wire feeder 150 to stop feeding and command the system 100 to wait (e.g., several milliseconds). In such an embodiment, the sensing and current controller 195 is operatively connected to the wire feeder 150 in order to command the wire feeder 150 to start and stop. The sensing and current controller 195 may command the power supply 170 to apply the heating current pulses to heat the wire 140 as described above, and this process can be repeated to deposit multiple droplets on a workpiece.

During operation, the high intensity energy source (e.g., laser device 120) and the wire 140 can be moved along a workpiece 115 to provide the droplets as desired. The motion controller 180 commands the robot 190 to move the workpiece 115 in relation to the laser beam 110 and the wire 140. The laser power supply 130 provides the power to operate the laser device 120 to form the laser beam 110. In further embodiments, the laser device 120 includes optics that can be adjusted to change the shape of the laser beam 110 on the impact surface of the workpiece. Embodiments can use the beam shape to control the shape of the deposition process, that is by using a beam with a rectangular, elliptical or oval shape a relative narrow deposition can be made, thus making a thinner walled structure. Further, the beam shape can be used to shape the deposition after the droplet has separated from the consumable.

As discussed above, the pulse current is to be turned off or greatly reduced when it is determined that the break between the wire 140 and the droplet D is about to occur. This can be accomplished in a number of different ways. For example, such sensing may be accomplished by a premonition circuit within the sensing and current controller 195 measuring a rate of change of one of a potential difference between (dv/dt), a current through (di/dt), a resistance between (dr/dt), or a power through (dp/dt) the wire 140 and the workpiece 115. When the rate of change exceeds a predefined value, the sensing and current controller 195 formally predicts that loss of contact is about to occur. Such premonition circuits are well known in the art for arc welding, and their structure and function need not be described in detail herein.

When the distal end of the wire 140 becomes highly molten due to heating, the distal end will begin to pinch off from the wire 140 onto the workpiece 115. For example, at that time, the potential difference or voltage increases because the cross section of the distal end of the wire decreases rapidly as it is pinching off. Therefore, by measuring such a rate of change, the system 100 can anticipate when the distal end is about to pinch off and lose contact with the workpiece 115.

As explained previously, when the separation of the droplet is sensed the current can be turned off or greatly reduced by the power supply 170. For example, in some exemplary embodiments, the current is reduced to be in the range of 95 to 85% of the peak current value of the pulses. In exemplary embodiments, this current reduction occurs before separation between the wire and the puddle.

For example, FIG. 5 illustrates an exemplary embodiment of a pair of voltage and current waveforms 510 and 520, respectively, associated with an additive manufacturing process of the present application. The voltage waveform 510 is measured by the sensing and current controller 195 between the contact tube 160 and the workpiece 115. The current waveform 520 is measured by the sensing and current controller 195 through the wire 140 and workpiece 115.

Whenever the distal end of the wire 140 is about to lose contact with the workpiece 115, the rate of change of the voltage waveform 510 (i.e., dv/dt) will exceed a predetermined threshold value, indicating that pinch off is about to occur (see the slope at point 511 of the waveform 510). As alternatives, a rate of change of current through (di/dt), a rate of change of resistance between (dr/dt), or a rate of change of power through (dp/dt) the filler wire 140 and the workpiece 115 may instead be used to indicate that pinch off is about to occur. Such rate of change premonition techniques are well known in the art. At that point in time, the sensing and current controller 195 will command the power supply 170 to turn off (or at least greatly reduce) the flow of current through the wire 140.

When the sensing and current controller 195 senses that the distal end of the filler wire 140 again makes good contact with the workpiece 115 after some time interval 530 (e.g., the voltage level drops back to about zero volts at point 512), the sensing and current controller 195 commands the power supply 170 to ramp up the flow of current (see ramp 525) through the resistive filler wire 140 toward a predetermined output current level 550. The time interval 530 can be a predetermined time interval. In accordance with an embodiment of the present invention, the ramping up starts from a set point value 540. This process repeats as the energy source 120 and wire 140 move relative to the workpiece 115 and as the wire 140 advances towards the workpiece 115 due to the wire feeder 150 to deposit droplets at the desired locations. In this manner, an arc is prevented from forming between the distal end of the wire 140 and the workpiece 115. Ramping of the heating current helps to prevent inadvertently interpreting a rate of change of voltage as a pinch off condition or an arcing condition when no such condition exists. Any large change of current may cause a faulty voltage reading to be taken due to the inductance in the heating circuit. When the current is ramped up gradually, the effect of inductance is reduced.

As explained previously, the power supply 170 provides a heating current to the filler wire 140. The current passes from the contact tip 160 to the wire 140 and then into the workpiece. This resistance heating current causes the wire 140 between the tip 160 and the workpiece to reach a temperature at or near the melting temperature of the filler wire 140 being employed. Of course, the heat required to reach the melting temperature of the filler wire 140 will vary depending on the size and chemistry of the wire 140. Accordingly, the heat to reach the desired temperature of the wire during manufacturing will vary depending on the wire 140. As will be further discussed below, the desired operating temperature for the filler wire can be a data input into the system so that the desired wire temperature is maintained during manufacturing. In any event, the temperature of the wire should be such that the wire 140 can deposit a droplet into the puddle.

In exemplary embodiments of the present invention, the power supply 170 supplies a current which causes at least a portion of the distal end of the wire 140 at a temperature at or above 90% of its melting temperature. For example, when using a filler wire 140 having a melting temperature around 2,000° F., the temperature of the wire as it contacts can be approximately 1,800° F. Of course, it is understood that the respective melting temperatures and desired operational temperatures will vary on at least the alloy, composition, diameter and feed rate of the filler wire 140. In further exemplary embodiments, portions of the wire are maintained at a temperature of the wire which is at or above 95% of its melting temperature. Of course, in some embodiments, the distal end of the wire is heated to at least 99% of its melting temperature by the heating current. Thus, when the heated droplet is in contact with the molten puddle created by the laser the heat from the puddle can add heat to the wire 140 so as to fully create the molten droplet at the end of the wire 140 so that the droplet is adhered to and stays with the puddle when the wire 140 is withdrawn. By maintaining the filler wire 140 at a temperature close to or at its melting temperature the wire 140 is easily melted into or consumed into the puddle created by the heat source/laser 120. That is, the wire 140 is of a temperature which does not result in significantly quenching the puddle when the wire 140 makes contact with the puddle. Because of the high temperature of the wire 140 the wire melts quickly when in contact with the puddle. In other exemplary embodiments, the wire can be heated to at or above 75% of its melting temperature. However, when heating to a temperature near 75% it will be likely that additional heating will be necessary to make the droplet sufficiently molten to transfer, which is further discussed below.

As described previously, in some exemplary embodiments, the complete melting of the wire 140 can be facilitated only by entry of the wire 140 into the puddle. However, in other exemplary embodiments the wire 140 can be completely melted by a combination of the heating current, the puddle and the laser beam 110 impacting on a portion of the wire 140. That is, the heating/melting of the wire 140 can be aided by the laser beam 110 such that the beam 110 contributes to the heating of the wire 140. However, because many filler wires 140 are made of materials which can be reflective, if a reflective laser type is used the wire 140 should be heated to a temperature such that its surface reflectivity is reduced, allowing the beam 110 to contribute to the heating/melting of the wire 140. In exemplary embodiments of this configuration, the wire 140 and beam 110 intersect at the point at which the wire 140 enters the puddle. This is shown in FIGS. 6A and 6B.

Figure 6A:
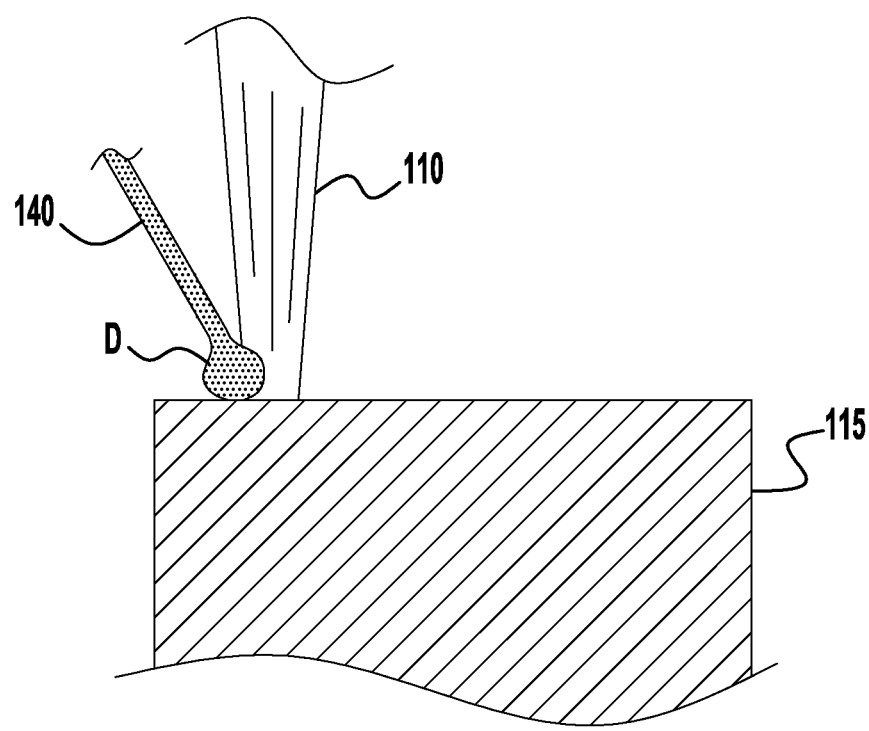
FIGS. 6A and 6B illustrate utilization of a laser to aid in droplet deposition.

As shown in FIG. 6A, in some exemplary embodiments, the beam 110 can be used to aid in the deposition of droplets D onto the workpiece 115. That is, the beam 110 can be used to add heat to the distal end of the wire 140 to create the molten droplet. In such embodiments, the heating current from the power supply can be kept at a level well below an arc generation level, thus ensuring that no arc will be created but proper droplet transfer can be achieved. In such embodiments the beam can be directed such that it only impacts the droplet D, or in other embodiments the beam 110 is large enough, shaped or rastered in a fashion that it impacts at least a portion of the droplet and at least some of the puddle to continue to add heat to the puddle to receive the droplet D. In exemplary embodiments of the energy density of the beam 110 during this phase of the process is typically less than the energy density of the beam when it is used to create the puddle on the workpiece 115.

Figure 6B:
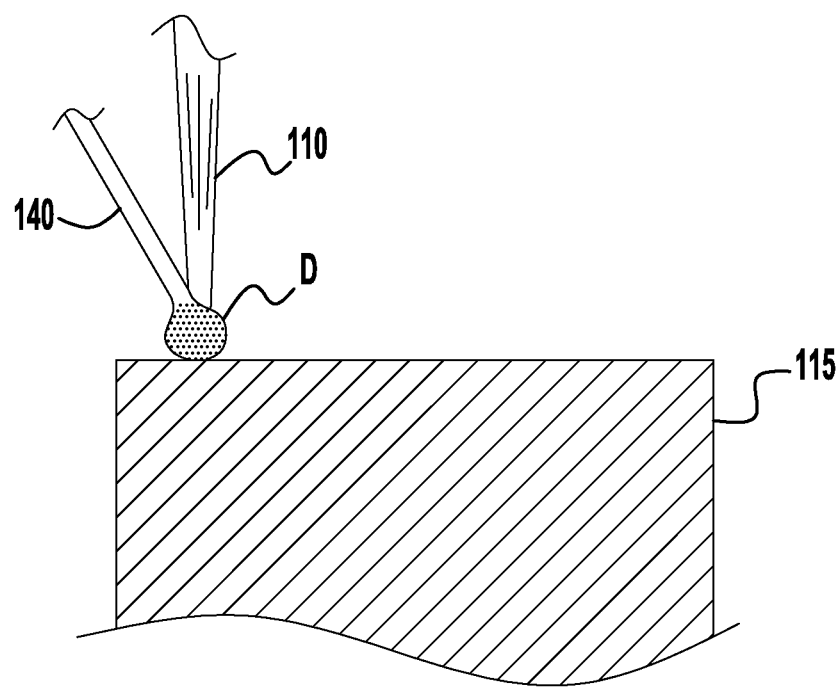

FIG. 6B depicts other exemplary embodiments of the present invention, where the beam 110 at the wire 140 just above the droplet to aid in its separation from the wire. In such embodiments, when it is sensed or determined that the wire 140 is necking down above the droplet, a beam 110 is directed to the wire at the connection between the droplet D and the wire 140 such that the beam 110 aids in separating the two. Such embodiments aid in the prevention of an arc being generated because it is not needed to use the heating current to control the separation. In some exemplary embodiments the beam 110 can come from the same laser 120 that is used to create the puddle initially. However, in other embodiments, the beam in FIG. 6B can also be emitted from a second separate laser which is also controlled by the controller 195. Thus, in such embodiments when the controller and/or power supply detects the formation of a droplet or the imminent separation of the droplet D, the output current of the power supply 170 can be dropped while the laser beam is directed to the wire 140 to cause the desired separation.

Figure 7:
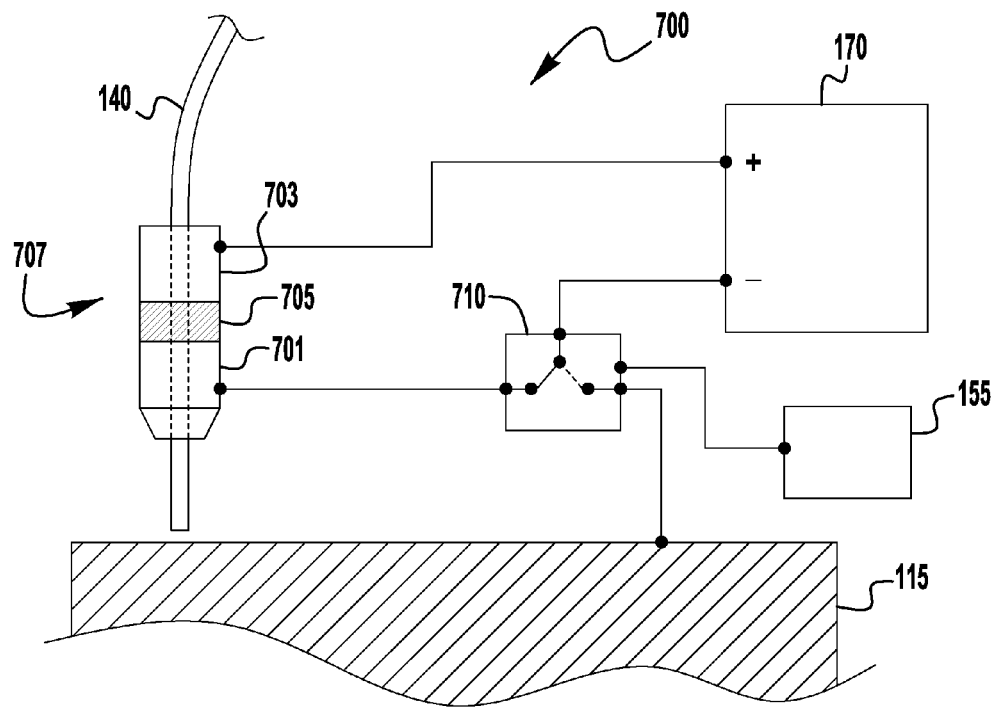
FIG. 7 illustrates an exemplary embodiment of wire heating system in accordance with an aspect of the present invention.

Turning now to FIG. 7, an exemplary embodiment of a heating system 700 and contact tip assembly 707 is shown. It is generally noted that embodiments of the present invention can utilize contact tips 160 and resistance heating systems that are known with respect to hot-wire or some welding systems, without departing from the spirit or scope of the present invention. However, in other exemplary embodiments, a system 700 as shown in FIG. 7 can be utilized. In this system 700 the contact tip assembly is comprised of two conductive portions 701 and 703 which are electrically isolated from each by a insulation portion 705, which can be made from any dielectric material. Of course, in other embodiments the insulation portion need not be present, so long as the tip portions 701 and 703 are electrically isolated from each other. The system 700 also includes a switching circuit 710 which switches the current path to/from the power supply 170 between the contact tip portion 701 and the workpiece 115. In some embodiments, it may be desirable to maintain the wire 140 at some threshold temperature during the manufacturing process while the wire 140 is not in contact with the workpiece 115. Without the wire 140 in contact with the workpiece 115 (e.g., during repositioning) no current will flow through the wire 140 and as such resistance heating will stop. Of course, residual heat will still be present but may degrade quickly. This embodiment allows the wire 140 to be continuously heated even though it is not in contact with the workpiece 115. As shown, one lead from the power supply is coupled to the an upper portion 703 of the contact tip assembly 707. During operation, when the wire 140 is in contact with the workpiece the switch 710 is positioned such that the current path is from the upper portion 703 through the wire 140 and the workpiece, returning to the power supply 170 (dashed line in switch 710). However, when the droplet D separates from the wire 140 and contact with the workpiece 115 is broken the switch 710 is switched such that the current path if from contact tip portion 703 to contact tip portion 701 and back to the power supply 170. This allows at least some heating current to pass through the wire to continue to resistance heat the wire at some background heating level. Because of such a configuration, the wire can be heated to its desired deposition level quicker. This is especially the case if there has been a long duration between droplet depositions, during which the wire could cool. Thus, in exemplary embodiments the power supply 170 provides a current pulse or pulses (as generally described herein) to deposit droplets when the switch 710 is in a first position (first current path) which directs the current through the work piece, and then the power supply 170 provides a background or heating current (which can be constant current for example) when the switch is in a second position (second current path) that directs the current through both portions 701/703 of the contact tip to keep the wire heated in between droplet transfers. In some embodiments the switch can switch between each droplet transfer pulse, while in other embodiments the switch can switch after a plurality of droplet transfer pulses. In exemplary embodiments, the background/heating current level is selected to be a level which keeps the wire at a desired—non melting—temperature. If the temperature is too high it can become difficult to push the wire to the puddle. In some exemplary embodiments, the background/heating current is in the range of 10 to 70% of a peak current level reached during the droplet transfer pulses.

It is noted that in FIG. 7 the switch 710 is shown external to power supply 170. However, this depiction is just for clarity and the switch can be internal to the power supply 170. Alternatively the switch can also be internal to the contact tip assembly 707. The insulation portion 705 can be made from any insulation type material or can simply be an isolative gap between the components 701 and 703. The switch can be controlled by the controller 195 (as shown) or can be controlled directly by the power supply 170 depending on the desired configuration.

In other exemplary embodiments, a wire preheating device can be positioned upstream of the assembly 707 which preheats the wire 140 before it enters the tip 707. For example, the preheating device can be an induction heating device, which requires no current flow through the wire 140 to heat the wire 140. Of course, resistance heating systems can also be used. This preheating device can be used to maintain the wire at a temperature as describe above. Further, the preheating can be used to also remove any undesirable moisture from the wire 140 before it is deposited (which is especially important when using Ti). Such preheating systems are generally known and need not be described in detail. The preheating device can be set to heat the wire 140 to a predetermined temperature before the wire enters the tip assembly 707, thus allowing the current from the power supply 170 to be used to deliver enough current to complete the deposition process. It should be noted that the preheating device should heat the wire 140 to a level which compromises the wire 140 such that the wire 140 can be properly pushed through the tip 707. That is, if the wire 140 is too hot it can become overly flexible, which can compromise the responsiveness of the wire 140 when being pushed.

Figure 8A:
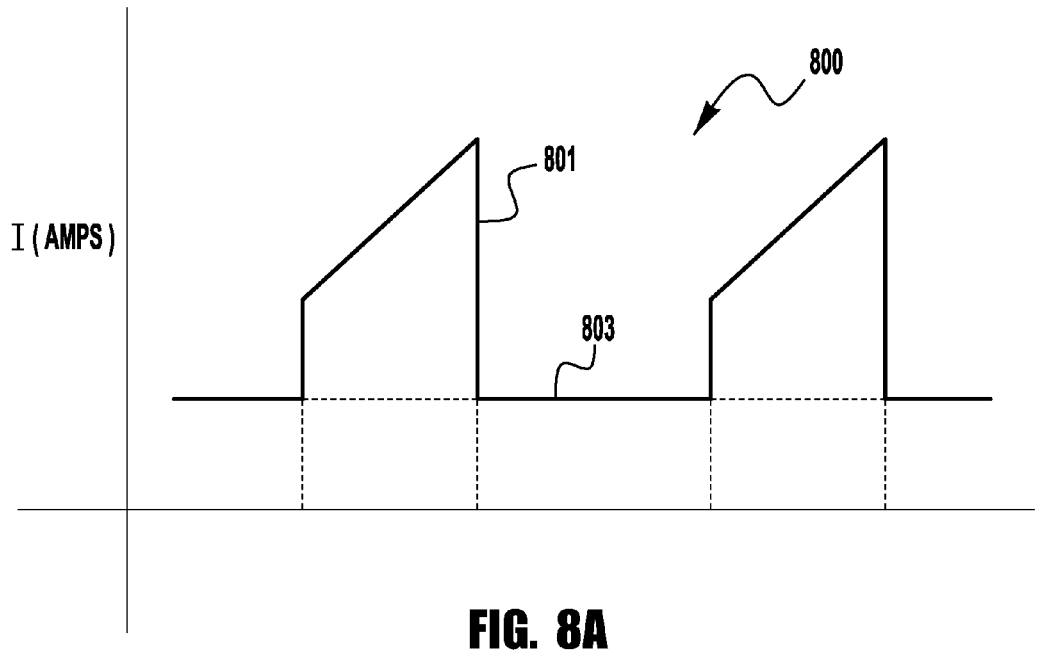
FIG. 8A illustrates an exemplary embodiment of a current waveform that can be used with the system of FIG. 7.

FIG. 8A depicts an exemplary manufacturing current waveform 800 that can be used with the system 700 in FIG. 7. In FIG. 8A a basic current waveform 800 is shown which comprises two components—a pulse portion 801 and a background portion 803. The pulse portion is comprised of current pulses used to deposit droplets as discussed herein. During these pulses the current is directed from the tip portion 703 through the workpiece 115. However, during the background portion the current is directed from the tip portion 703 to portion 701 to heat the wire 140 when it is not in contact with the workpiece 115. Of course, it should be noted that the connections of the contact tip portions 701/703 to the positive and negative power supply terminals as shown in FIG. 7 is exemplary and the connections can be reversed based on the desired system set up and performance. As explained previously, the background current level 803 between pulses 801 is used to keep the wire at a sustained temperature between droplet depositions. In some exemplary embodiments of the present invention, the background current keeps the wire 140 at a temperature which is in the range of 40 to 90% of the melting temperature of the wire 140. In other exemplary embodiments, the current 803 keeps the wire 140 at a temperature in the range of 50 to 80% of the melting temperature of the wire 140.

It is further noted that it may not be desirable or necessary to constantly switch to the background current between each pulse 801. This could be particularly true during a high rate of droplet deposition. That is, during a high rate of droplet deposition, the wire 140 will be maintained at a high level of temperature between droplets. Thus, in some exemplary embodiments, the switching to the background heating current (as described above) occurs only after a time duration has expired or when the duration between droplet pulses exceeds a threshold time. For example, in some embodiments, if the time between pulses is to exceed 1 s the system 700 will use the switching and background heating current as described above. That is, if the manufacturing method utilized has a pulse frequency over a determined threshold frequency then the above switching will be used. In exemplary embodiments of the present invention, this threshold is in the range of 0.5 to 2.5 s between pulses. In other embodiments, the system 700 can utilize a timer (internal to the controller 195 and/or the power supply 170) which monitors the time between pulses and if the time exceeds a threshold amount the switching and background heating current described above will be utilized. For example, if the system 700 determines that a latency between pulses has exceeded a threshold time limit (for example, 1 s) then the background heating current will be utilized to keep the wire 140 at a desired temperature. Such an embodiment can be utilized in embodiments where the set threshold time has expired—that is, in real time the system 700 determines that the time limit has expired, or can be used when the system 700 predicts that the next pulse will not occur before the expiration of the time limit. For example, if the system 700 (e.g., controller 195) determines that the next pulse will not occur before the expiration of the time limit (for example, due to movement of the workpiece 115 and/or wire 140 then the system 700 can immediately initiate the switching and background heating current described above. In exemplary embodiments of the present invention, this duration threshold is in the range of 0.5 to 2.5 seconds.

Figure 8B:
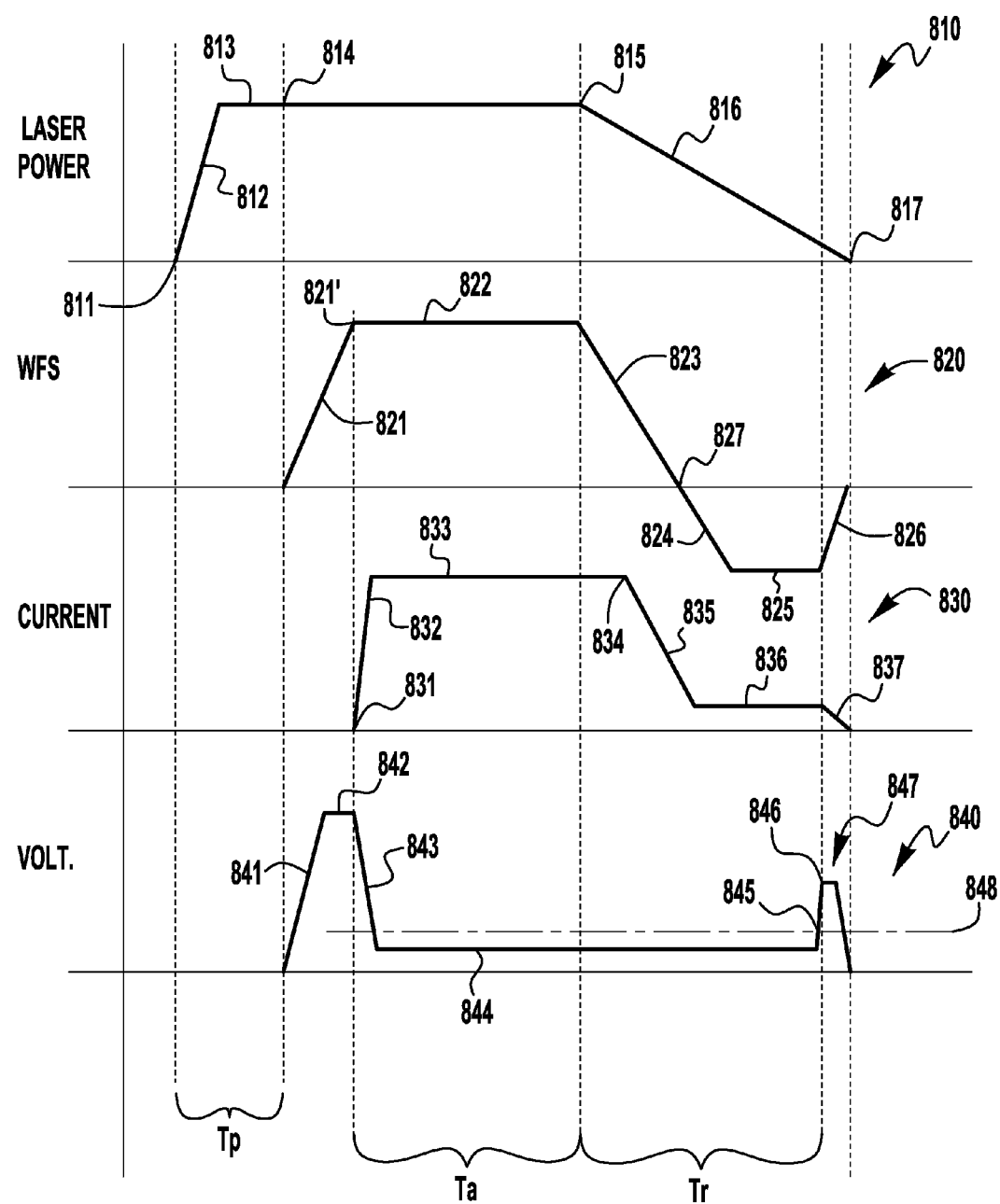
FIG. 8B illustrates an exemplary embodiment of waveforms for current, voltage, wire feed speed and laser power for an exemplary embodiment of the present invention.

FIG. 8B depicts exemplary waveforms that can be used with exemplary embodiments of the present invention to deposit a droplet as described herein. The exemplary waveforms are for the transfer of a single droplet according to embodiments of the present invention. The waveforms shown are for laser power 810, wire feed speed 820, additive wire heating current 830, and voltage 840. It should be understood that the waveforms depicted are intended to be exemplary and other embodiments of the present invention can use other waveforms having different characteristics than shown or described herein. As shown, the droplet transfer cycle begins at 811, where the laser power is directed at the workpiece and is increased 812 to a peak laser power level 813. After a duration Tp the laser creates a puddle on the workpiece at point 814. At this point the wire feeder starts to drive the additive wire towards the puddle. The wire feed speed increases 821 to a peak wire feed speed 822 after the puddle is created at 814. In exemplary embodiments of the present invention, the wire feed speed reaches its peak level 822 at approximately the same time as the distal end of the wire makes contact with the puddle 821'. However, in other exemplary embodiments the wire feed speed can reach its peak level 822 prior to the wire making contact. As shown, at the same time the wire feeding process begins an open circuit voltage is applied to the wire 841 so that it reaches a peak voltage level 842 at some point prior to wire making contact with the puddle. Also, when the wire makes contact with the puddle the heating current 830 starts to flow (at point 831), and the voltage 840 begins to drop 843. The voltage drops to a level 844 which is below an arc detection voltage 848, above which it is determined that an arc would be created.

After the wire makes contact with the puddle the laser power 810, wire feed speed 820 and current 830 are maintained at their respective peak levels for a period of time Ta, during which a droplet of the wire is deposited into the puddle. After the expiration of the deposition time period Ta (at 815), which can be for a predetermined period of time controlled by the heating power supply (for example, using a timer circuit), the laser power is ramped down 816, along with the wire feed speed 823. The heating current 830 is maintained at its peak level 833 for a period of time after the expiration of the time period Ta (top point 834) and while the laser power and the wire feed speed are being decreased. This aids in separating the droplet from the wire. After the droplet addition period Ta a wire retraction period Tr begins. After the current 830 starts its ramp down 835 (starting at point 834) the wire feed speed is reduced to zero (at point 827) and the wire feeder is controlled to retract the wire 824 at a peak retraction speed 825. Also, during the retraction period the current 830 is reduced to a burnback current level 836 which is used to provide burnback of the wire as it is withdrawn from the puddle. During the wire retraction period Tr the current 830 is maintained at the burnback current level 836 until the voltage reaches or passes the arc detection voltage level 848 at point 845, which is caused by the wire separating from the puddle (causing current to drop and voltage to increase). When the voltage level 848 is reached, an arc suppression routine 847 is initiated to prevent an arc from being generated. During this time, the voltage climbs to a peak level 846.

The arc detection voltage level 848 is a predetermined level used by the power supply and/or system controller to ensure that no arc is generated between the retreating wire and the workpiece. The arc detection voltage level 848 is set by the power supply and/or system controller based on various user inputs, including, but not limited to, wire type, wire diameter, workpiece material type, droplet per inch input, droplet per minute input, etc.

When the arc detection voltage level 848 is reached (at 845) the current 830 is shut off by the power supply (837) and the retraction of the wire is stopped (826) and the droplet transfer cycle ends at point 817, when the current 830 and wire feed speed 820 each reach 0. In the embodiment shown, the laser power 810 is also shown being shut off at the end of the cycle at point 817. In other exemplary embodiments, the laser power 810 is shut off at the time the arc voltage threshold 848 is reached (at point 845). This cycle is then repeated for a plurality of droplet deposits.

In some exemplary embodiments, (not shown) a laser power pulse can be initiated between droplet transfer cycles (as shown in FIG. 8B) to aid in smoothing the workpiece or otherwise adding energy to the workpiece in between droplet transfers. For example, a laser power pulse can be initiated in between each droplet transfer cycle, or in other embodiments a laser power pulse can be initiated after a number n of droplet transfer cycles, as needed.

Figure 9:
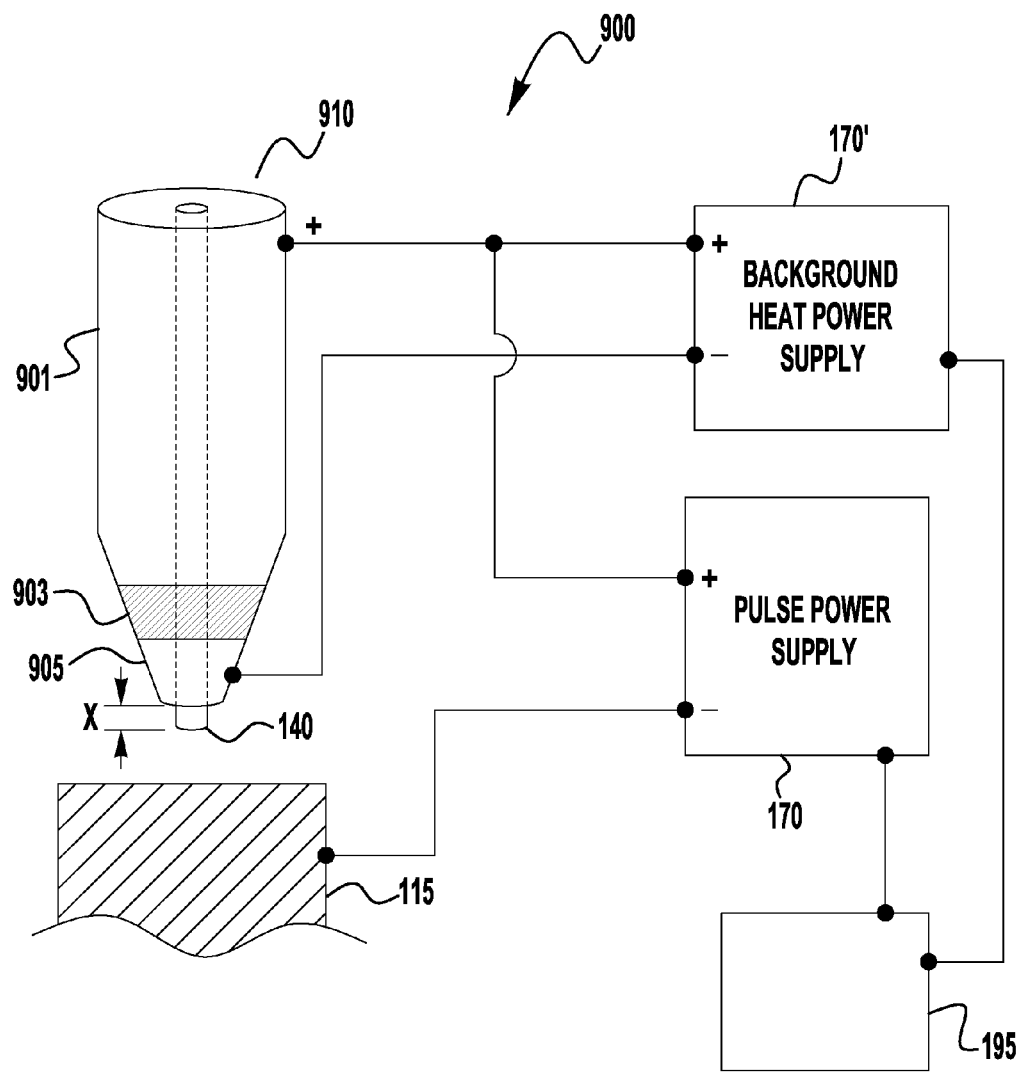
FIG. 9 illustrates another exemplary embodiment of a wire heating system of the present invention.

FIG. 9 depicts another exemplary system 900 of the present invention. The system 900 comprises a background power supply 170' and a pulsing power supply 170. This system operates very similar to that discussed above, except that the background heating current is supplied by a separate power supply 170'. Thus, in some embodiments the background power supply 170' can provide a constant heating current during manufacturing and it is not necessary to provide the switching discussed above. The pulsing power supply 170 operates as described otherwise herein, except that its peak output current can be reduced because of the additional heating/current being provided by the power supply 170'. In such embodiments, the level of control or precision with the pulse power supply 170 can be increased. That is, the pulse power supply 170 can reach its peak pulse level quicker because of the lesser current demands on the power supply 170. Of course, the same will be true in decreasing current. Each of the power supplies 170/170' can be controlled by the controller 195, or can be configured in a master/slave relationship, which is generally known. Furthermore, although these power supplies are shown separately for clarity, they can be housed within a single unit without departing from the spirit or scope of the present invention.

Also, shown in FIG. 9 is another contact tip assembly 900, having conductive portions 901 and 905 and insulation portion 903. In this embodiment, the conductive portion 905 is configured such that the heating current is transmitted as close to the exposed distal end of the wire 140 as possible. Such a configuration helps to ensure that the heating of the wire is maintained as close to the distal end as possible, optimizing the effects of the background heating. In further embodiments, the stick out X of the distal end of the wire 140 from the contact tip 910 is kept to a minimum distance. If the stick out X is maintained too long the heating effects from the background heating current can be adversely affected. Thus, in some exemplary embodiments, the stick out X is maintained in the range of 0.1 to 0.5 inches. In other exemplary embodiments, the stick out is maintained in the range of 0.2 to 0.4 inches. Further, in additional exemplary embodiments, to obtain further benefits from the background heating, between droplet pulses the wire 140 is retracted fully, or near fully, into the contact tip 900, such that the stick out X is in the range of 0 to 0.15 inch. Such embodiments are capable of keeping the distal end of the wire 140 at the desired background heating temperature without overheating other portions of the wire 140 not close to the distal end. In other exemplary embodiments, the stick out distance can be larger, particularly when using larger diameter consumables. For example, in some exemplary embodiments, the stick out distance can be in the range of 0.75 to 2 inches. Of course, in some other embodiments a longer stick out can be utilized.

Figure 10:
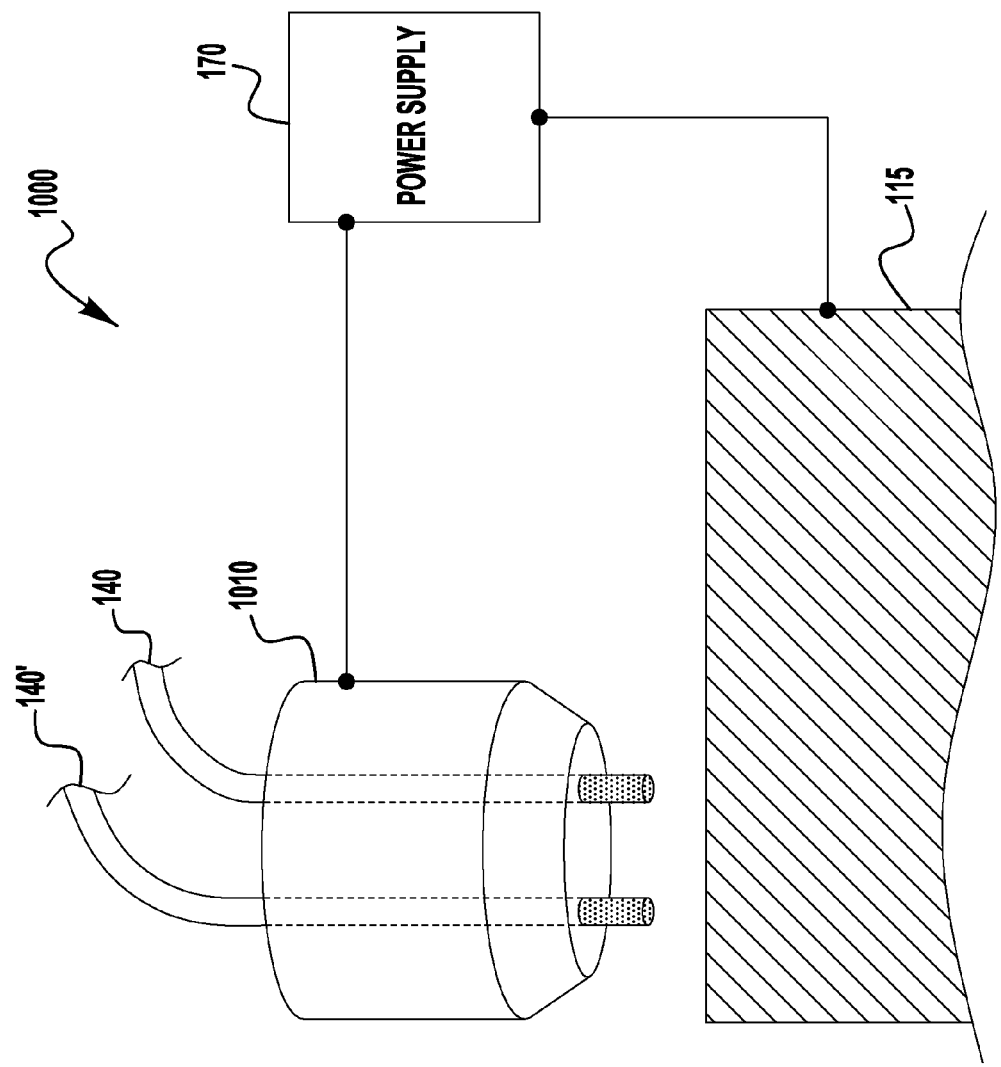
FIG. 10 illustrates a further exemplary embodiment of the present invention using multiple wires.

Turning now to FIG. 10, another exemplary system 1000 is depicted, where the contact tip assembly 1010 is capable of delivering more than one wire 140/140' to the workpiece 115. In some additive manufacturing operations it may be desirable to utilize different wires for different portions of the manufacture. The system 1000 allows for the switching between different wires depending on what is desired for the manufacturing. Although not shown, each wire 140/140' can be coupled to its own wire feeding apparatus to advance retract the respective wires 140/140' as needed during manufacturing. Thus, during manufacturing the controller 195 can position the contact tip assembly 1010 such that the appropriate wire is to be used for the manufacturing. For example, it may be desirable to build a base with a first consumable 140 having first properties, and then add to that base a layer made with the wire 140', having different properties to achieve a desired manufacturing result. For example, the wires 140/140' can have different sizes, shapes, and/or composition based on the desired manufacturing parameters. It should also be noted that although the contact tip assembly is shown with only two wires 140/140', embodiments of the present invention, can utilize a contact tip assembly, or separate contact tips to provide any number of varying consumables. Embodiments of the present invention are not limited in this regard.

Furthermore, the contact tip assembly 1010 in FIG. 10 is shown such that the wires 140/140' are not insulated from each other. In such an embodiment, the appropriate wire is advanced to the workpiece 115 for deposition, and as such the current from the power supply 170 will be directed through that wire—causing deposition. When the wire is to be changed, the other wire is advanced while the other is retracted such that the current path is now through the other wire. In other exemplary embodiments, the contact tip assembly 1010 can be constructed such that the wires 140/140' are electrically isolated from each other. In such embodiments, switching, like that discussed regarding FIG. 7, can be utilized. In some exemplary embodiments, a laser beam (not shown in FIG. 10) can affect or otherwise alter the energy distribution in the puddle between the wires 140 and 140' by being scanned between the two wires. This The positioning and movement of the contact tip assembly 1010 relative to the workpiece 115 can be effected by any number of means. Specifically, any known robotic or motion control systems can be used without departing from the spirit or scope of the present invention. That is, the appropriate wire 140/140' can be positioned using any known means or methods, including robotic systems, and can be controlled by controller 195. For example, the contact tip assembly 1010 can comprise three or more different wires and be constructed and utilized similar to known computer numerical control (CNC) machining heads which are rotated and positioned to allow for the utilization of appropriate tooling. Such systems and control logic can be utilized in embodiments of the present invention to provide the desired positioning of the desired wire.

The wires (or consumables) used with embodiments of the present invention are to have a size and chemistry as needed for a particular manufacturing operation. Typically, the wires have a circular cross-section, by other embodiments are not limited in this way. Other exemplary embodiments can utilize wires having a non-circular cross-section based on the manufacturing method and manufacturing process. For example, the wires can have a polygonal, oval, or elliptical shape to achieve a desired manufacturing criteria. Circular cross-section wires can have a diameter in the range of 0.010 to 0.045 inch. Of course, larger ranges (for example, up to 5 mm) can be used if desired, but the droplet control may become more difficult as the diameter increases. Because of the use of the laser and the heating control methodologies describe herein, embodiments of the present invention can provide very precise manufacturing. This is particularly true with embodiments that utilize smaller diameter wires, such as in the range of 0.010 to 0.020 inch. By using such small diameters a large DPI (droplets per inch) ratio can be achieved, thus providing highly accurate and detailed manufacturing. The chemistry of the wires is to be selected to provide the desired properties for the manufactured component. Further, the wire(s) utilized can either have a solid or metal-core configuration. Cored wires can be used to create a composite material construction. For example, a cored wire having an aluminum sheath and an aluminum oxide core can be used.

It is further noted that because no arc is used with the processes describe herein, most applications of the present invention will not require shielding gas of any kind. However, in some applications it may be desirable to use a shielding gas to prevent oxidation, or for other purposes.

Figure 11:
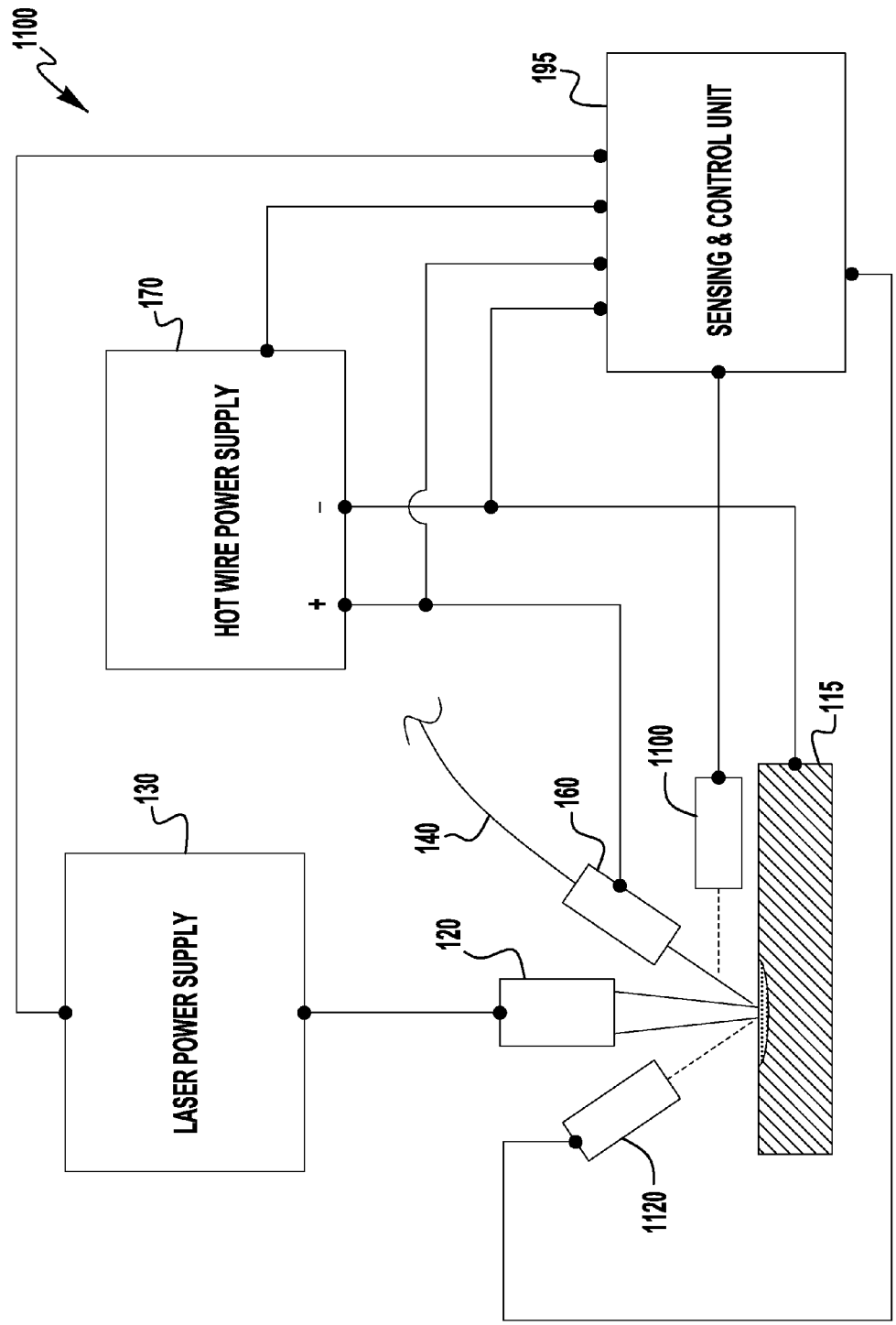
FIG. 11 illustrates another exemplary embodiment of a system of the present invention.

FIG. 11 depicts yet another exemplary embodiment of the present invention. FIG. 11 shows an embodiment similar to that as shown in FIG. 1. However, certain components and connections are not depicted for clarity. FIG. 1 depicts a system 1100 in which a thermal sensor 1110 is utilized to monitor the temperature of the wire 140. The thermal sensor 1110 can be of any known type capable of detecting the temperature of the wire 140. The sensor 1110 can make contact with the wire 140 or can be coupled to the tip 160 so as to detect the temperature of the wire. In a further exemplary embodiment of the present invention, the sensor 1110 is a type which uses a laser or infrared beam which is capable of detecting the temperature of a small object—such as the diameter of a filler wire—without contacting the wire 140. In such an embodiment the sensor 1110 is positioned such that the temperature of the wire 140 can be detected at the stick out of the wire 140—that is at some point between the end of the tip 160 and the puddle. The sensor 1110 should also be positioned such that the sensor 1110 for the wire 140 does not sense the puddle temperature.

The sensor 1110 is coupled to the sensing and control unit 195 (discussed with regard to FIG. 1) such that temperature feedback information can be provided to the power supply 170 and/or the laser power supply 130 so that the control of the system 1100 can be optimized. For example, the power or current output of the power supply 170 can be adjusted based on at least the feedback from the sensor 1110. That is, in an embodiment of the present invention either the user can input a desired temperature setting (for a given manufacturing operation and/or wire 140) or the sensing and control unit 195 can set a desired temperature based on other user input data (electrode type, etc.) and then the sensing and control unit 195 would control at least the power supply 170 to maintain that desired temperature.

In such an embodiment it is possible to account for heating of the wire 140 that may occur due to the laser beam 110 impacting on the wire 140 before the wire enters the puddle. In embodiments of the invention the temperature of the wire 140 can be controlled only via power supply 170 by controlling the current in the wire 140. However, as explained above, in other embodiments at least some of the heating of the wire 140 can come from the laser beam 110 impinging on at least a part of the wire 140. As such, the current or power from the power supply 170 alone may not be representative of the temperature of the wire 140. As such, utilization of the sensor 1110 can aid in regulating the temperature of the wire 140 through control of the power supply 170 and/or the laser power supply 130.

In a further exemplary embodiment (also shown in FIG. 11) a temperature sensor 1120 is directed to sense the temperature of the puddle. In this embodiment the temperature of the puddle is also coupled to the sensing and control unit 195. However, in another exemplary embodiment, the sensor 1120 can be coupled directly to the laser power supply 130. Feedback from the sensor 1120 is used to control output from laser power supply 130/laser 120. That is, the energy density of the laser beam 110 can be modified to ensure that the desired puddle temperature is achieved.

In yet a further exemplary embodiment of the invention, rather than directing the sensor 1120 at the puddle, it can be directed at an area of the workpiece 115 adjacent the puddle. Specifically, it may be desirable to ensure that the heat input to the workpiece 115 adjacent the deposition location is minimized. The sensor 1120 can be positioned to monitor this temperature sensitive area such that a threshold temperature is not exceeded adjacent the deposition location. For example, the sensor 1120 can monitor the workpiece temperature and reduce the energy density of the beam 110 based on the sensed temperature. Such a configuration would ensure that the heat input adjacent the deposition location would not exceed a desired threshold. Such an embodiment can be utilized in precision manufacturing operations where heat input into the workpiece is important.

In another exemplary embodiment of the present invention, the sensing and control unit 195 can be coupled to a feed force detection unit (not shown) which is coupled to the wire feeding mechanism (not shown—but see 150 in FIG. 1). The feed force detection units are known and detect the feed force being applied to the wire 140 as it is being fed to the workpiece 115. For example, such a detection unit can monitor the torque being applied by a wire feeding motor in the wire feeder 150, and thus parameters related to the contact between the distal end of the wire 140 and the workpiece 115. This, coupled with current and/or voltage monitoring, can be used to stop the feeding of the wire after contact is made with the puddle to allow for the separation of the droplet D. Of course, as indicated previously, the controller 195 can just use voltage and/or current sensing to detect contact between the wire 140 and the puddle and can use this information alone to stop wire feeding if desired when contact is made.

In a further exemplary embodiment, the sensor 1120 can be used to detect the size of the puddle area on the workpiece. In such embodiments, the sensor 1120 can be either a heat sensor or a visual sensor and used to monitor an edge of the puddle to monitor the size and/or position of the puddle. The controller 195 then uses the detected puddle information to control the operation of the system as described above.

The following provides further discussion regarding the control of the heating pulse current that can be used with various embodiments of the present invention. As mentioned previously, when the distal end of the wire 140 is in contact with puddle/workpiece 115 the voltage between the two can be at or near 0 volts. However, in other exemplary embodiments of the present invention it is possible to provide a current at such a level so that a voltage level above 0 volts is attained without an arc being created. By utilizing higher currents values it is possible to have the wire 140 reach high temperatures, closer to an electrode's melting temperature, at a quicker rate. This allows the manufacturing process to proceed faster. In exemplary embodiments of the present invention, the power supply 170 monitors the voltage and as the voltage reaches or approaches a voltage value at some point above 0 volts the power supply 170 stops flowing current to the wire 140 to ensure that no arc is created. The voltage threshold level will typically vary, at least in part, due to the type of wire 140 being used. For example, in some exemplary embodiments of the present invention the threshold voltage level is at or below 6 volts. In another exemplary embodiment, the threshold level is at or below 9 volts. In a further exemplary embodiment, the threshold level is at or below 14 volts, and in an additional exemplary embodiment; the threshold level is at or below 16 volts. For example, when using mild steel wires the threshold level for voltage will be of the lower type, while wires which are for stainless steel manufacturing can handle the higher voltage before an arc is created. Thus, such a system can monitor the voltage and control the heating current by comparing the voltage to a voltage set point, such that when the voltage exceeds, or is predicted to exceed the voltage set point, the current is shut off or reduced.

In further exemplary embodiments, rather than maintaining a voltage level below a threshold, such as above, the voltage is maintained in an operational range. In such an embodiment, it is desirable to maintain the voltage above a minimum amount—ensuring a high enough current to maintain the wire at or near its melting temperature but below a voltage level such that no arc is created. For example, the voltage can be maintained in a range of 1 to 16 volts. In a further exemplary embodiment the voltage is maintained in a range of 6 to 9 volts. In another example, the voltage can be maintained between 12 and 16 volts. Of course, the desired operational range can be affected by the wire 140 used for the manufacturing operation, such that a range (or threshold) used for an operation is selected, at least in part, based on the wire used or characteristics of the wire used. In utilizing such a range the bottom of the range is set to a voltage at which the wire can be sufficiently deposited in the puddle and the upper limit of the range is set to a voltage such that the creation of an arc is avoided.

As described previously, as the voltage exceeds a desired threshold voltage the heating current is shut off by the power supply 170 such that no arc is created. Thus, in such embodiments the current can be driven based on a predetermined or selected ramp rate (or ramp rates) until the voltage threshold is reached and then the current is shut off or reduced to prevent arcing.

In the many embodiments described above the power supply 170 contains circuitry which is utilized to monitor and maintain the voltage as described above. The construction of such type of circuitry is known to those in the industry. However, traditionally such circuitry has been utilized to maintain voltage above a certain threshold for arc welding.

As explained previously, the heating current can also be monitored and/or regulated by the power supply 170. This can be done in addition to monitoring voltage, power, or some level of a voltage/amperage characteristic as an alternative. That is, the current can be driven to, or maintained, at a desired level to ensure that the wire 140 is maintained at an appropriate temperature—for proper deposition in the puddle, but yet below an arc generation current level. For example, in such an embodiment the voltage and/or the current are being monitored to ensure that either one or both are within a specified range or below a desired threshold.

The power supply 170 then regulates the current supplied to ensure that no arc is created but the desired operational parameters are maintained.

In yet a further exemplary embodiment of the present invention, the heating power (V×I) can also be monitored and regulated by the power supply 170. Specifically, in such embodiments the voltage and current for the heating power is monitored to be maintained at a desired level, or in a desired range. Thus, the power supply not only regulates the voltage or current to the wire, but can regulate both the current and the voltage. In such embodiments the heating power to the wire can be set to an upper threshold level or an optimal operational range such that the power is to be maintained either below the threshold level or within the desired range (similar to that discussed above regarding the voltage). Again, the threshold or range settings will be based on characteristics of the wire and manufacturing being performed, and can be based—at least in part—on the filler wire selected. For example, it may be determined that an optimal power setting for a mild steel electrode having a diameter of 0.045" is in the range of 1950 to 2,050 watts. The power supply will regulate the voltage and current such that the power is driven to this operational range. Similarly, if the power threshold is set at 2,000 watts, the power supply will regulate the voltage and current so that the power level does not exceed but is close to this threshold.

In further exemplary embodiments of the present invention, the power supply 170 contains circuits which monitor the rate of change of the heating voltage (dv/dt), current (di/dt), and or power (dp/dt). Such circuits are often called premonition circuits and their general construction is known. In such embodiments, the rate of change of the voltage, current and/or power is monitored such that if the rate of change exceeds a certain threshold the heating current to the wire 140 is turned off.

In other exemplary embodiments of the present invention, the change of resistance (dr/dt) is also monitored. In such an embodiment, the resistance in the wire between the contact tip and the puddle is monitored. As explained previously, as the wire heats up it starts to neck down and this can create a tendency to form an arc, during which time the resistance in the wire increases exponentially. When this increase is detected the output of the power supply is turned off as described herein to ensure an arc is not created. Embodiments regulate the voltage, current, or both, to ensure that the resistance in the wire is maintained at a desired level.

Figure 12:
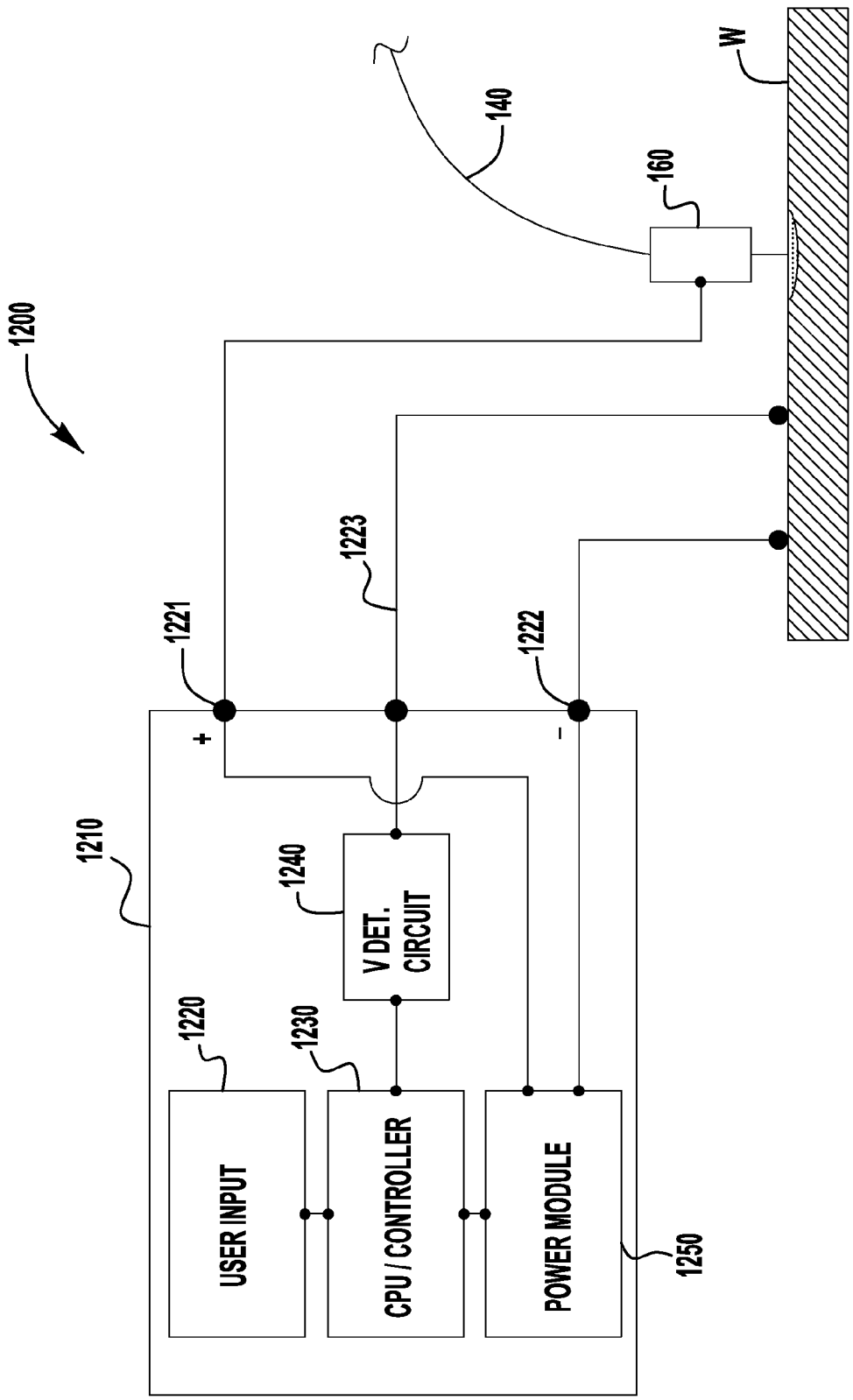
FIG. 12 illustrates a power supply system in accordance with an embodiment of the present invention.

FIG. 12 depicts an exemplary system 1200 which can be used to provide the heating current to wire 140. (It should be noted that the laser system is not shown for clarity). The system 1200 is shown having a power supply 1210 (which can be of a type similar to that shown as 170 in FIG. 1). The power supply 1210 can be of a known welding/heating power supply construction, such as an inverter-type power supply. Because the design, operation and construction of such power supplies are known they will not be discussed in detail herein. The power supply 1210 contains a user input 1220 which allows a user to input data including, but not limited to: wire type, wire diameter, a desired power level, a desired wire temperature, voltage and/or current level. Of course, other input parameters can be utilized as needed. The user interface 1220 is coupled to a CPU/controller 1230 which receives the user input data and uses this information to create the needed operational set points or ranges for the power module 1250. The power module 1250 can be of any known type or construction, including an inverter or transformer type module. It is noted that some of these components, such as the user input 1220 can also be found on the controller 195.

The CPU/controller 1230 can determine the desired operational parameters in any number of ways, including using a lookup table. In such an embodiment, the CPU/controller 1230 utilizes the input data, for example, wire diameter and wire type to determine the desired current level for the output (to appropriately heat the wire 140) and the threshold voltage or power level (or the acceptable operating range of voltage or power). This is because the needed current to heat the wire 140 to the appropriate temperature will be based on at least the input parameters. That is, an aluminum wire 140 may have a lower melting temperature than a mild steel electrode, and thus requires less current/power to melt the wire 140. Additionally, a smaller diameter wire 140 will require less current/power than a larger diameter wire. Also, as the manufacturing speed increases (and accordingly the deposition rate) the needed current/power level to melt the wire may be higher.

Similarly, the input data will be used by the CPU/controller 1230 to determine the voltage/power thresholds and/or ranges (e.g., power, current, and/or voltage) for operation such that the creation of an arc is avoided. For example, for a mild steel electrode having a diameter of 0.045 inches can have a voltage range setting of 6 to 9 volts, where the power module 1250 is driven to maintain the voltage between 6 to 9 volts. In such an embodiment, the current, voltage, and/or power are driven to maintain a minimum of 6 volts—which ensures that the current/power is sufficiently high to appropriately heat the electrode—and keep the voltage at or below 9 volts to ensure that no arc is created and that a melting temperature of the wire 140 is not exceeded. Of course, other set point parameters, such as voltage, current, power, or resistance rate changes can also be set by the CPU/controller 1230 as desired.

As shown, a positive terminal 1221 of the power supply 1210 is coupled to the contact tip 160 of the system and a negative terminal of the power supply is coupled to the workpiece W. Thus, a heating current is supplied through the positive terminal 1221 to the wire 140 and returned through the negative terminal 1222. Such a configuration is generally known.

A feedback sense lead 1223 is also coupled to the power supply 1210. This feedback sense lead can monitor voltage and deliver the detected voltage to a voltage detection circuit 1240. The voltage detection circuit 1240 communicates the detected voltage and/or detected voltage rate of change to the CPU/controller 1230 which controls the operation of the module 1250 accordingly. For example, if the voltage detected is below a desired operational range, the CPU/controller 1230 instructs the module 1250 to increase its output (current, voltage, and/or power) until the detected voltage is within the desired operational range. Similarly, if the detected voltage is at or above a desired threshold the CPU/controller 1230 instructs the module 1250 to shut off the flow of current to the tip 160 so that an arc is not created. If the voltage drops below the desired threshold the CPU/controller 1230 instructs the module 1250 to supply a current or voltage, or both to continue the manufacturing process. Of course, the CPU/controller 1230 can also instruct the module 1250 to maintain or supply a desired power level. Of course, a similar current detection circuit can be utilized, and is not shown for clarity. Such detection circuits are generally known.

It is noted that the detection circuit 1240 and CPU/controller 1230 can have a similar construction and operation as the controller 195 shown in FIG. 1. In exemplary embodiments of the present invention, the sampling/detection rate is at least 10 KHz. In other exemplary embodiments, the detection/sampling rate is in the range of 100 to 200 KHz.

In each of FIGS. 1 and 11 the laser power supply 130, power supply 170 and sensing and control unit 195 are shown separately for clarity. However, in embodiments of the invention these components can be made integral into a single system. Aspects of the present invention do not require the individually discussed components above to be maintained as separately physical units or stand-alone structures.

In some exemplary embodiments described above, the system can be used in such a fashion to combine cladding and droplet deposition as described above. That is, during the construction of a workpiece it may not always be required to have high precision construction, for example during the creation of a supporting substrate. During this phase of construction a hot wire cladding process can be used. Such a process (and systems) are described in U.S. application Ser. No. 13/212,025, which is incorporated herein by reference in its entirety. More specifically, this application is incorporated fully herein to the extent it described the systems, methods of use, control methodology, etc. used to deposit material using a hot-wire system in a cladding or other type of overlaying operation. Then, when a more precise deposition methodology is desired to construction the workpiece the controller 195 switches to a droplet deposition method, as described above. The controller 195 can control the systems described herein to utilize droplet deposition and cladding deposition processes as needed to achieve the desired construction.

Embodiments described above can achieve high speed droplet deposition. For example, embodiments of the present invention can achieve droplet deposition in the range of 10 to 200 Hz. Of course, other ranges can be achieved depending on the parameters of the operation. In some embodiments, the droplet deposition frequency can be higher than 200 Hz, depending on some of the parameters of the operation. For example, larger diameter wires will typically use a deposition frequency less than 200 Hz, whereas smaller diameter wires, such as in the range of 0.010 to 0.020 inch can achieve faster frequencies. Other factors that affect the droplet deposition frequency include laser power, workpiece size and shape, wire size, wire type, travel speed, etc.

Figure 13:
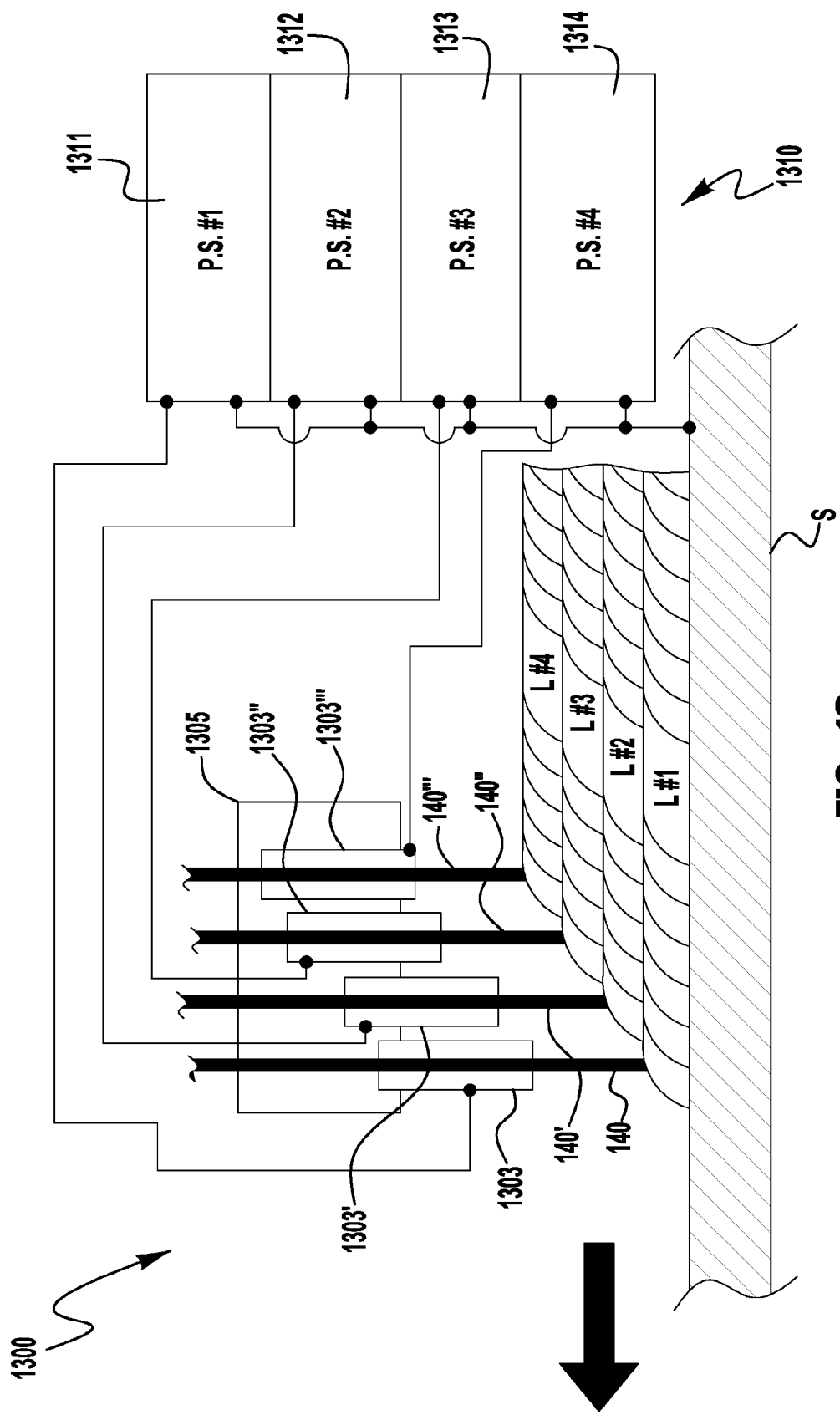
FIG. 13 illustrates an embodiment of a system which uses multiple consumables at one time.

FIG. 13 depicts another exemplary embodiment of the present invention, where a plurality of consumables can be deposited at the same time. In the embodiment shown four consumables are being deposited. However, embodiments are not limited in this regard as any number can be utilized. In such embodiments, the buildup of the workpiece can be accelerated as multiple consumables can be deposited in a single pass. As will be described further below, other advantages to such a configuration are also attained.

As shown in the exemplary system 1300, a contact tip assembly 1305 houses a plurality of contact tips 1303, 1303', 1303", 1303'", each of which deliver a consumable 140, 140', 140", 140"' (respectively) to the workpiece being created. In the shown embodiment, each of the contact tips are electrically isolated from each other such that each contact tip can receive a separate current waveform to be used for deposition. For example, as shown in the exemplary system 1300, a power supply is electrically coupled to each contact tip so as to separately provide and control the current waveform for each consumable. As a note the system controller 195 is not shown in this Figure. However, the system 1300 can include a controller 195 as described previously herein to control the operation of each of the power supplies, as well as the operation. In the embodiment shown, a power supply system 1310 is shown having distinct individual power supply modules P.S. #1 through P.S. #4 (1311, 1312, 1313 and 1314), each of which is capable of outputting a distinct current to deposit the consumables. Each of the currents can be similar to the exemplary waveforms described herein, having different parameters, etc. Further, each of the power supplies 1311-1314 can be constructed and operated similar to the power supplies discussed herein with respect to FIGS. 1 through 12. In some exemplary embodiments, each of the power supplies 1311-1314 can be separate power supply modules in a single power supply system 1310—for example being within a single housing. In other exemplary embodiments, each of the power supplies 1311-1314 can be separate and distinct power supplies, which can be linked to each other to synchronize, and otherwise control, their operation.

During operation, the system 1300 can create a workpiece on a substrate S by depositing multiple layers in a single pass. In the FIG. 13 embodiment, each consumable 140-140''' is creating a separate layer L#1, L#2, L#3, L#4, where each trailing consumable is creating a layer on top of the preceding layer. This is accomplished by having the tips 1303-1303''' in line with each other in the travel direction as shown. During deposition, the leading consumable 140 is deposited onto the substrate S creating the first layer L#1, and the trailing consumable 140' is deposited onto the previous layer L#1, to create a second layer L#2—and so on. To allow for the creation of the layers, at different heights, the contact tip assembly 1305 can position the contact tips are different heights relative to the substrate S surface. As shown in FIG. 13, the contact tips have a staggered or stepped formation to allow for the stacking of the layers. In other exemplary embodiments, the contact tips can be at the same level, relative to the surface, but the stick-out distance of the consumables can be adjusted appropriately to achieve the desired stacking of layers.

In exemplary embodiments of the present invention, the spacing between the consumables (in the travel direction) is such that the subsequent layers can be adequately constructed on the previously deposited layer. In exemplary embodiments, the spacing is such that the consumables are not deposited in the same puddle. That is, the trailing consumable does not make contact with the preceding puddle. However, the respective puddles are adjacent to each other on the workpiece. That is, in exemplary embodiments, while the puddles are adjacent or near to each other, their molten portions do not contact each other. Of course, the puddles can be at different elevation levels (see e.g., FIG. 13), and the temperature of the deposit between the puddles can be very high, but the molten portions are not contacting each other.

It is noted that although not shown in FIG. 13, the system 1300 can also use a laser or heat input system as described in the above exemplary embodiments. Specifically, the system 1300 can use a laser to create a molten puddle and/or aid in melting the consumable. In some exemplary embodiments, individual beams can be directed to each separate consumable deposition process and be controlled individually for each respective deposition process. The individual beams can be generated from separate laser emitting devices, or can come from a single laser emitting device, but is divided into separate beams via optics and laser splitters, etc. The deposition of each individual consumable 140 to 140''' can be controlled as described previously. Alternatively, in other exemplary embodiments a single laser/heat source can be used which is rastered between consumables during the deposition process to provide the desired heat input for each consumable deposition process. For example, a laser beam can be rastered to the deposition of each consumable 140-140''' and the interaction time at each consumable location is controlled to achieve the desired heat input for each deposition operation.

In exemplary embodiments of the present invention, the type, size and composition of the consumables 140-140''' is chosen based on the desired properties of the workpiece. In some embodiments, each of the consumables 140-140''' are the same, having the same diameter and composition. However, in other exemplary embodiments, the consumables can have different properties. For example, the consumables 140-140''' can have different diameters, such that the layers L#1-L#4 can be made with different widths, by using varying diameter consumables. Moreover, the consumables can have different compositions to allow for the creation of a workpiece having varying physical/compositional characteristics at different places. In such embodiments, the composition of a workpiece being manufactured can be changed "on the fly". That is, a first material can be used to make certain portions of a workpiece—using some contact tips—and then without stopping the system can deposition a different or additional materials—as desired.

For example, exemplary embodiments of the present invention can be used to manufacture a structure or workpiece using a mixture of stainless steel and mild steel. Further, such structures can be built with a nickel material being added. Of course, these are simply exemplary and embodiments of the present invention allow for the mixture of multiple materials to be build a desired structure. In other exemplary embodiments, a band or layer of non-magnetic material/metal can be added to the workpiece for various reasons, including measurement of the workpiece. Differing materials can also be used to convert a material to an austenitic stainless steel.

In addition to varying properties/types of the consumables, embodiments of the present invention can deliver the consumables 140-140''' with varying wire feed speeds. That is, in some embodiments, the wire feed speed for all of the consumables is the same. However, in other embodiments it may be desirable to vary the wire feed speeds. This can be done via the controller 195 and the respective wire feeding systems of the consumables (not shown for clarity). By varying the respective wire feed speeds, the physical properties of the workpiece being created can be affected. For example, it may be desirable to have at least one of the layers L#1 to L#4 thinner than the others. In such embodiments, the wire feed speed for the respective consumable of the thinner layer can be slowed, thus resulting in a thinner layer.

Moreover, in exemplary embodiments different current waveforms can be provided to the consumables 140-140'''. In the system 1300 shown there are separate power supply modules 1311-1314 providing the respective deposition currents to the consumables. In some embodiments, each of the currents can be the same, while in other embodiments the current waveforms can be different—having different frequencies, peak current levels, etc. This can be the case when using differing wire feed speeds and/or differing consumables to ensure proper deposition.

By varying aspects of the deposition of any of the consumables 140-140''' the system 1300 provides significant flexibility in the creation of the layers L#1-L#4. That is, in exemplary embodiments any one, or a combination of, consumable type, composition, diameter, wire feed speed, and deposition current waveform can be varied, relative to another consumable, to achieve a desired property of a layer or the deposition process. Thus, embodiments of the present invention allow for the rapid construction or build-up of a workpiece with a significant amount of flexibility and precision in the construction of any layer or the deposition of a consumable. That is, different layers can have different thicknesses, widths, shapes, etc. based on the use of varying deposition/consumable properties.

Figure 14:
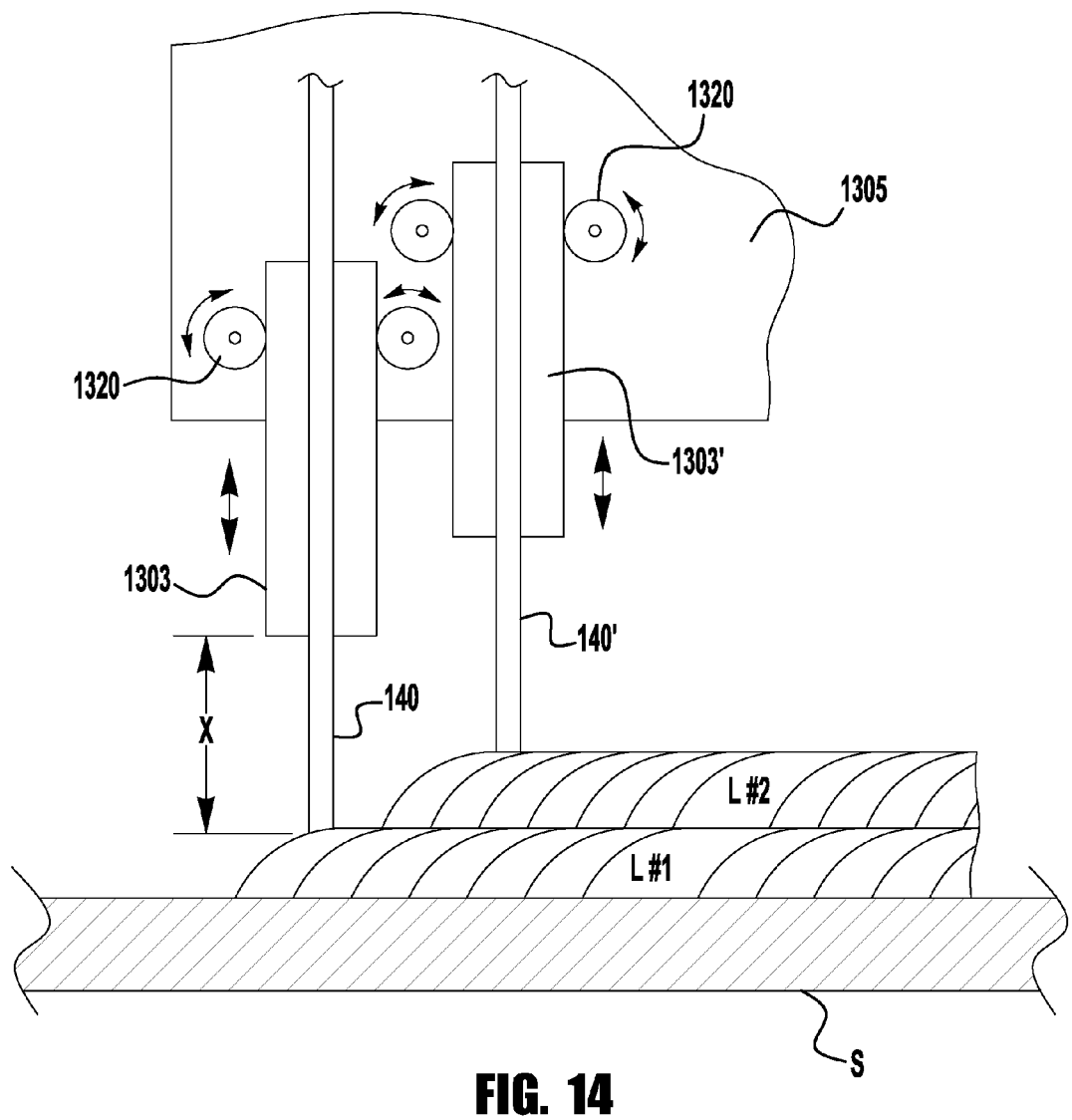
FIG. 14 illustrates an another embodiment of the system in FIG. 13.

FIG. 14 depicts another view of the system 1300 shown in FIG. 13. As shown, and discussed above, the contact tips 1303 and 1303' are mounted to the contact tip assembly 1305 which orients, holds and moves the contact tips as desired. Further, as discussed above, the contact tips are held in a staggered or stepped pattern to allow for the creation of the layers on top of each other—as shown. In such embodiments, the stick-out X for each of the respective consumables 140, 140' is maintained as generally the same distance. However, in other embodiments this need not be the case. That is, the stick-out distance X for each respective consumable 140,140' can be varied to achieve a desired deposition performance. In fact, in some embodiments, the contact tips 1303,1303' can be secured such that their respective distal end faces are co-planar with each other, relative to the surface of the substrate S. In such an arrangement the stick-out distance X of trailing consumables (e.g., 140') would be less than each preceding consumable (e.g., 140) when layers L#1, L#2 are being constructed as shown.

Further, as shown, in some embodiments the contact tips 1303,1303' are movable within the contact tip assembly 1305. In such embodiments, an actuator mechanism 1320, such as rollers, an actuator, etc. can be used to move the contact tips 1303,1303' in and out of the contact tip assembly 1305 to provide the desired stick-out and/or geometry of the workpiece being constructed. The actuators 1320 can also be controlled by the controller 195 (not in FIG. 14) such that the contact tips can be moved "on the fly" during a deposition process. For example, during deposition the relative height of the contact tips and/or stick out distance X of the consumables can be adjusted to achieve the desired geometry of the workpiece being manufactured. This movement can be created a number of ways as described above. For example, servos, motor control rollers, linear actuators, etc. can be used to move the contact tips as desired. Such control enhances the flexibility of the manufacturing capabilities of the system 1300.

It is noted, that while FIGS. 13 and 14 depict the contact tip assembly 1305 such that the consumables are in line in a travel/deposition direction, the contact tip assembly 1305 can also be positioned in a lateral configuration where the contact tips are in a line which is normal to the travel direction. That is, the contact tips can be side-by-side to provide a wide material deposition. In such an embodiment, the consumables are deposited adjacent to each other, rather than on top of each other as shown in the FIGS. 13 and 14. Of course, in other exemplary embodiments, the contact tip assembly 1305 can be oriented such that the contact tips are oriented at an angle relative to the travel direction. Embodiments of the present invention are not limited in this regard.

Figure 15:
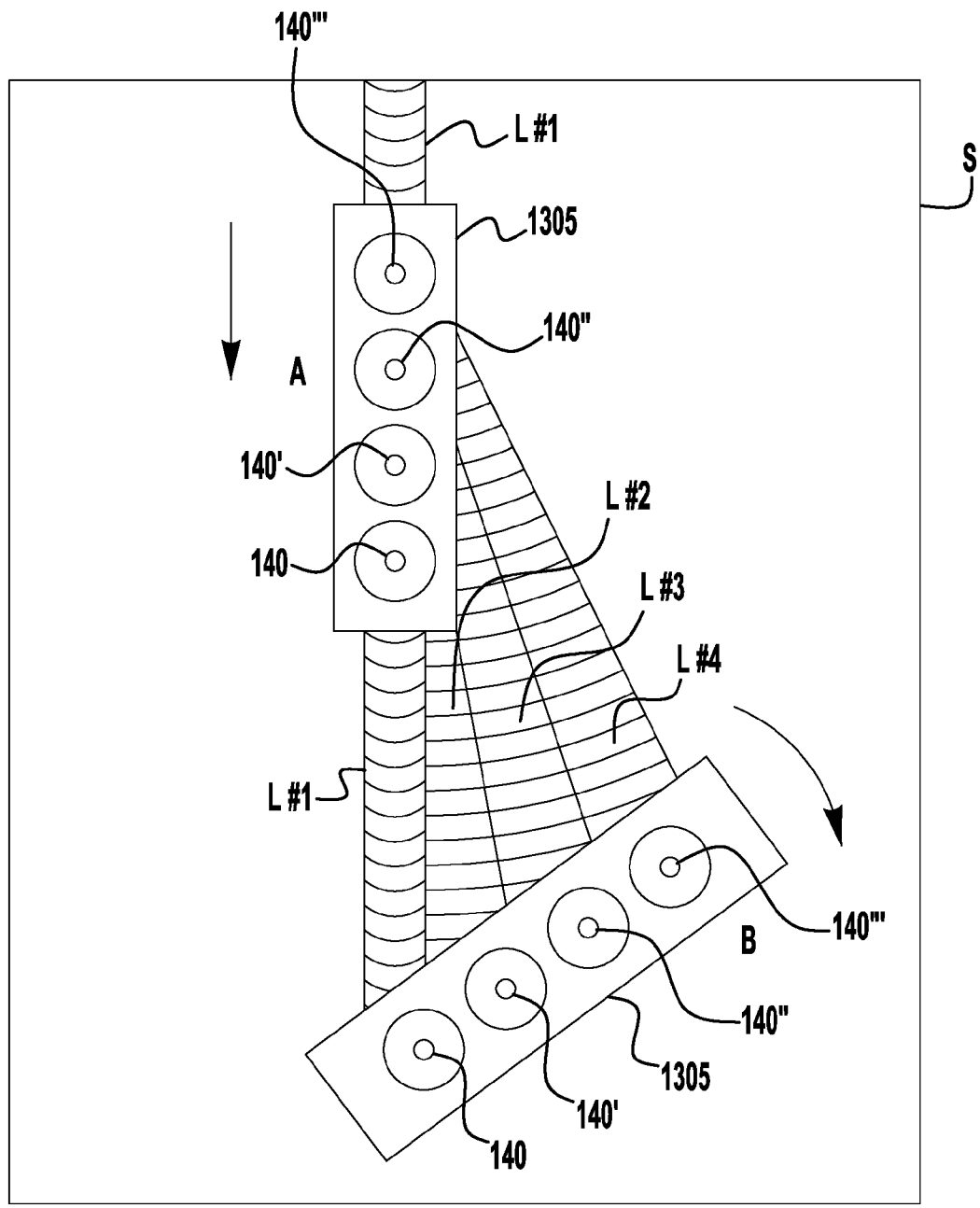
FIG. 15 illustrates a further exemplary embodiment of the system shown in FIG. 13.

FIG. 15 depicts another exemplary embodiment, where the contact tip assembly 1305 is also rotatable relative to the travel direction of the deposition process. As shown in this top down view, in a first position A the consumable are deposited in line as shown in FIGS. 13 and 14. As the contact tip assembly 1305 continues to travel, it is rotated to a new position B such that the deposition of the layers changes shape, as shown. The contact tip assembly 1305 can be controlled and rotated by any known devices and methods, such as by using a step motor, motor, or any other known system (for example, those systems used in robotic welding to control/facilitate movement and rotation). The controller 195 can be used to control the rotation/movement of the contact tip assembly 1305 relative to the substrate S. By having the assembly 1305 rotatable, a shape of the workpiece can be created as needed. For example, a wall thickness of a workpiece can be increased/decreased as needed. Further, during the rotation of the assembly 1305 any one, or a combination of, the wire feed speed, the current waveform, stick-out and/or contact tip position of for any of the consumables can be adjusted. For example, as shown in FIG. 15, prior to position A only one of the consumables is being deposited to create the layer L#1, as shown. This can be the leading consumable in the assembly. As the assembly 1305 is turned, a second consumable 140' begins being deposited for a second layer L#2 such that the deposit L#2 couples to and adds onto the first layer L#1. This can be down without adding undesired height, but just to increase the width of the workpiece being created. Similarly, the subsequent consumables 140" and 140'" can begin deposition similarly and sequentially as the assembly 1305 is rotated to the desired position B. Similarly, this motion can be used to create a ledge or overhang on the workpiece without the need for additional support for the overhang. In such embodiments, the rotation of the assembly 1305 and the adjustment of the deposition of any one, or all, of the consumables (as described above) can allow an overhang to be created relatively easily. For example, the adjustment of the feed rate and/or the stick out/contact tip depth positioning can allow for the creation of a ledge relatively simply.

Therefore, the system 1300 greatly increases the manufacturing flexibility of the additive manufacturing processes and systems described herein.

FIGS. 16, 17A-C and 18A depict exemplary embodiments of a substrate 1600 that can be used with the methods and systems described herein. The substrate 1600 is electrically conductive—so as to provide for a current path for the deposition current/waveform—but also has a non-bonding surface 1610 such that it is relatively easy to remove a workpiece from the substrate 1600 after completion of the manufacturing process.

Typically, in additive manufacturing, the workpiece being constructed is placed on a substrate or surface which is conductive so as to provide a proper current path for the consumable heating current. However, because the substrate is conductive (i.e. metallic) the workpiece becomes bonded with the substrate. That is, during the initial manufacture of the workpiece, the initially created layers become adhered to the substrate via the deposition process. Because of this, an additional processing step is needed to remove the workpiece from the substrate and potentially remove some of the substrate material from the final workpiece. This adds additional processing as well as creates a potential risk of damage to the workpiece. It is understood by those of ordinary skill in the art that bonding between a workpiece and the substrate typically occurs when there is fusion between the workpiece and the substrate, such that the material from the workpiece mixes with the material of the substrate in an admixture zone on the substrate—consistent with joining technologies. Embodiments of the present invention address this issue.

Figure 16:
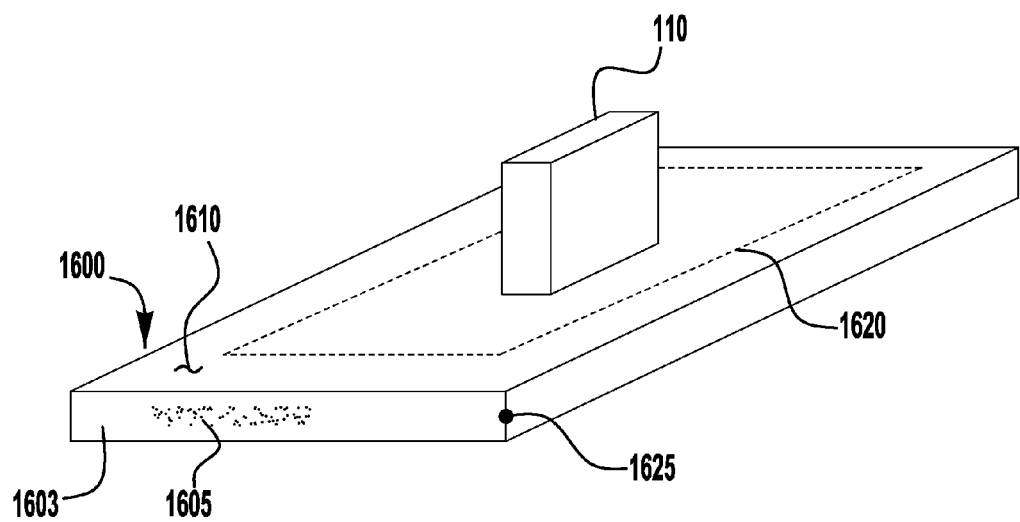
FIG. 16 illustrates an exemplary embodiment of a non-bonding manufacturing substrate.

FIG. 16 depicts an exemplary substrate 1600 which is made from a conductive material, which allows current to pass through it, but prevents the workpiece 110 from bonding to it. For example, in some exemplary embodiments the substrate can be made from copper or graphite, which are conductive but will not bond with aluminum or steel workpieces. In additional exemplary embodiments the substrate 1600 can be made as a matrix of a number of different materials. For example, the substrate 1600 can be made from a non-electrically conductive ceramic or clay material matrix material which has a conductive (e.g., metallic) material distributed within the ceramic or clay matrix so as to create a conductive path. As shown in FIG. 16, the non-conductive matrix 1603 has conductive particles 1605 distributed throughout it such an electrical current path can be made from the surface 1610 to a ground point 1625—to which a lead from a power supply can be connected. In some exemplary embodiments, the substrate 1600 can be primarily ceramic with copper particles 1605 distributed throughout, having a sufficient amount of copper to provide a copper density that allows an electrical current to be transferred from the workpiece surface of the substrate to another location of the substrate, to which a ground or current cable is secured. The conductive material 1605, which can be copper, can be in either a powder, granular, string or ribbon form. However, the conductive material should be distributed such that the an electrically conductive path is formed from the surface 1600 to the ground point 125. The ground point 125 can be positioned anywhere on the substrate 1600. It is noted that in some exemplary embodiments it is not necessary for the conductive material be distributed evenly throughout the entire substrate structure 1600 but it should be distributed sufficiently throughout the workpiece surface 1610 to provide for a current path from where a workpiece is positioned or started on the substrate surface 1610. The matrix material 1603 can be any material, or combination of materials which will not bond with the workpiece. The materials can be non-conductive and have a high melting temperature so that the surface of the matrix 1603 will not melt during the formation of the workpiece on the surface. As indicated above, the matrix material can be any one of, or a combination of clay, ceramic. Other materials can include cast iron, with a high carbon content or any other alloy which would become brittle when the additive process is conducted on the surface. As described above, the additive process has a relatively low (if any) admixture, so propagation of the alloy from the substrate into the build will be minimal. However, the propagation can be such that the first layer of the build becomes brittle, while at the same time still being conductive. When the build is complete the user can then easily bend and break the brittle interface to separate the build from the substrate. As indicated above, a ceramic material can be used for the substrate. Such ceramics should have a high melting temperature, such as $Al_2O_3$, or other similar ceramics. In another example, an aluminum material or alloy can be used as a substrate for a mild steel build.

In a further exemplary embodiment, the substrate can be made from a metallic powder having a density such that the substrate provides the desired conductivity and physical support for the build workpiece. In such embodiments, the powder can be easily knocked away from the build piece once completed. In even further exemplary embodiments, the substrate can be comprised of a conductive layer (e.g., copper, carbon, iron, etc.) placed on a base of nonconductive material, such as ceramic, which may or may not have conductive materials within the base material. By using a thin layer on a base material, the penetration into the substrate can be minimized, thus ensuring that there is no bonding to the substrate.

As shown in FIG. 16, in some exemplary embodiments, the substrate 1600 can have a contact zone 1620 in which the conductive material is present and outside of which the conductive material is not present, or is present to a lesser extent so that the substrate 1600 is less or non-conductive outside of the contact zone 1620. In such embodiments, the workpiece 110 is started or placed on the surface 1610 such that it contacts the contact zone 1620 to ensure sufficient electrical contact, as outside of the contact zone 1620 little or no electrical conductivity will exist. In such embodiments, the contact zone 1620 has an area which is less than the area of the surface 1610. Further, the contact zone 1620 can be shaped in any desired shape. Thus, in exemplary embodiments, to begin an additive manufacturing process the process begins in the contact zone 1620 of the surface 1610 to ensure that a current path for the workpiece exists. As the workpiece 110 is constructed portions of the workpiece can be formed on the surface 1610 outside of the contact zone 1620 so long as the workpiece is made as an integral piece—thus having a constant current path. Thus, a current path will always be provided for the manufacturing process, and the workpiece 110 can be manufactured on a conductive surface 1610 which does not bond to the workpiece 110, allowing for easy removal and processing of the workpiece.

Figure 17A:
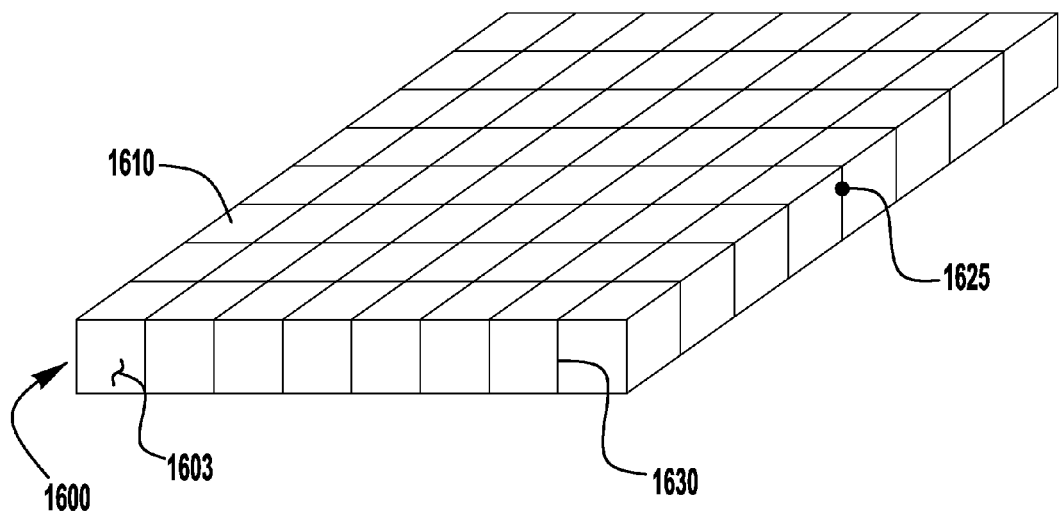
FIGS. 17A to 17C illustrate further exemplary embodiments of a non-bonding manufacturing substrate.

FIG. 17A depicts another exemplary embodiment where the substrate 1600 has a lattice 1630 of conductive material which creates a grid structure on the surface 1610 of the substrate 100. The lattice 1630 is made from a conductive material, such as copper, is embedded in the material of the substrate 1600, which can be ceramic, clay or other non-conductive materials. The lattice 1630 can be formed such that a grid structure is formed on the surface 1610 such that regardless of the size or orientation of the workpiece 110 to be formed, the workpiece will contact at least some of the lattice 1630 to provide the needed conductive path. The lattice 1630 is to have a mesh size to provide the desired spacing for the size of the workpieces that are to be made on the substrate 1600. In some embodiments, the lattice 1630 can have a depth that goes through the substrate 1600, while in other embodiments the depth of the lattice 1630 does not go all the way through the substrate 1600. Further, the lattice structure 1630 is formed such that the structure is conductive throughout so that regardless of where a workpiece makes contact with the lattice structure 1630 there is an electrical path to the ground point 1625. Further, in exemplary embodiments, the lattice structure 1630 can exist in the substrate 1600 only in a contact zone similar to that described with respect to FIG. 16. That is, the lattice structure exposed to the surface 1610 is only in a discrete area of the surface 1610 (i.e., contact zone) and the lattice is coupled to the ground point 1625. In such embodiments, so long as some portion of the workpiece is in the contact zone and makes contact with a portion of the lattice 1630, a current path exists to allow for the manufacture of the workpiece. Again, however, because most of the surface 1610 is non-conductive and non-bonding, the removal and processing of the workpiece is easy as compared to known substrates.

Figure 17B:
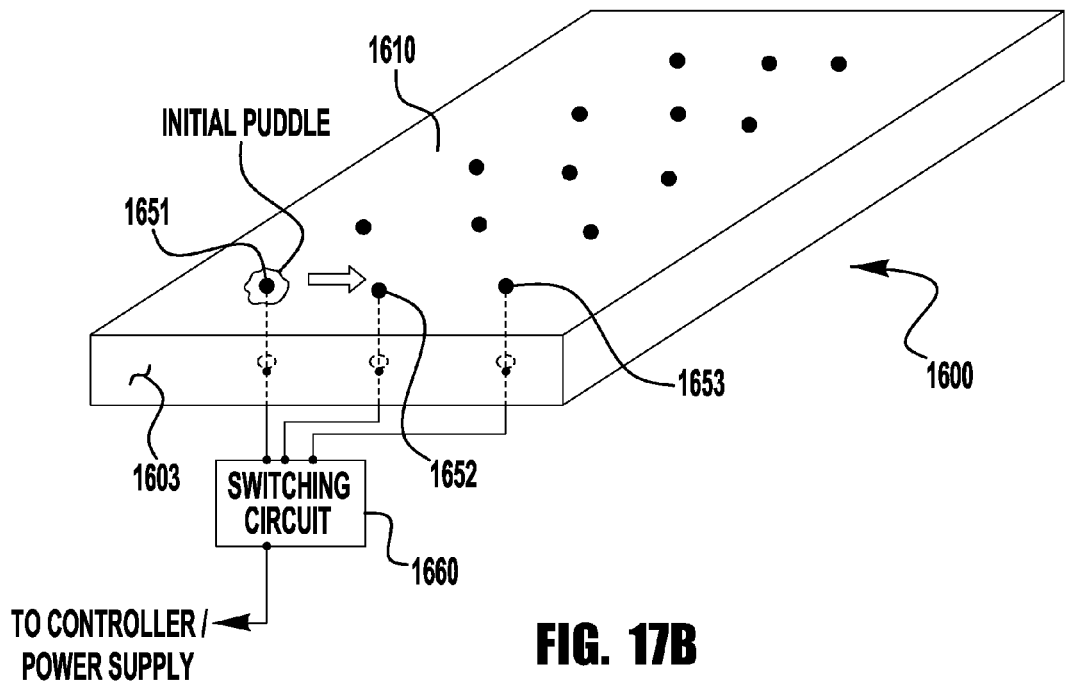

FIG. 17B shows another exemplary embodiment of a substrate 1600 that can be used with devices described herein. In this embodiment, the substrate 1600 comprises a plurality of discrete ground points 1651/1652/1653, etc. distributed through an area of the substrate 1600. The points can be distributed in a pattern, such as a lattice pattern such that their respective locations are known to the controller of any system using the substrate. The ground points are made from a conductive material, and can be wires, pins, etc., and can pass through the substrate 1600 such that they each are also exposed on another surface of the substrate 1600. In the embodiment shown in FIG. 17B the ground points pass through the substrate 1600 such that their other ends are exposed on the bottom surface of the substrate 1600. In other embodiments, the other ends can come out of a side face, if desired. Each of the ground points 1651, 1652, 1653, etc. are electrically coupled to a switching circuit 1660 which is also electrically coupled to the power supply of the system and to the controller, which controls the operation of ground switches within the circuit 1660 as described below. Because the location of the ground points are known, an additive process can be started on one of the ground points (e.g., point 1651) which serves as the initial ground path for the additive process. Once the process is started, the puddle can be moved along the surface 1610 until it reaches a next ground point 1652. The switching circuit 1660 can allow the controller to switch the ground point of the build process to the nearest ground point to the ongoing additive process. That is, as the contact tip of the process is moved the ground point can be switched to provide the nearest ground path to the operation. Further, in other exemplary embodiments, the switching circuit 1660 can open up more than one ground paths—through a plurality of ground points—to increase the amount of current that can be used for the process. Further, in exemplary embodiments, the switching circuit 1660 can be used to steer the ground current path to different locations to control the deposition process. For example, as the build process nears an edge of the substrate 1600 the switch 1660 can switch to ground points which are closer to the center of the substrate 1660 to aid in controlling the deposition process and the puddle. This can also be used to aid in controlling the direction of an arc, to the extent any arc is initiated in the deposition process.

Figure 17C:
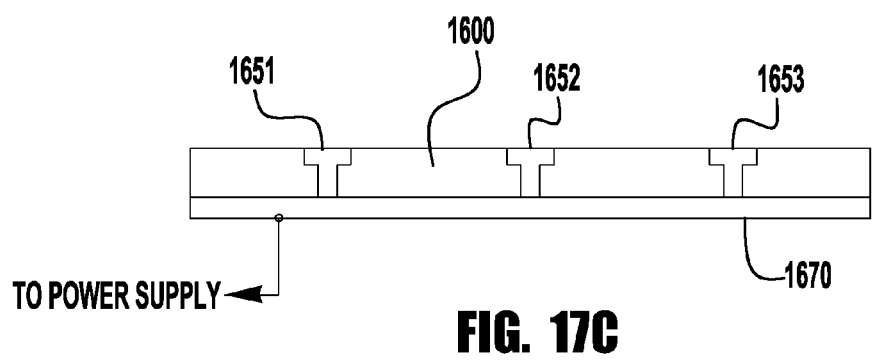

FIG. 17C shows a further exemplary embodiment of the present invention, where the substrate 1600 further includes a conductor 1670 which electrically couples all of the ground points 1651, 1652, 1653, etc., and the conductor 1670 is coupled to the power supply, to complete the ground path for the deposition current. In such embodiments, no switching circuit 1660 as described above need be used. In the embodiment shown, the conductor 1670 is a conductive plate or layer mounted to a surface of the substrate 1600, to which all of the ground points are coupled. Of course, the conductor 1670 need not be on the bottom surface, but can also be on another surface of the substrate 1600. During use, as the build structure contacts more than one ground point 1651, etc., additional ground paths are provided to the conductor 1670, again allowing more current to be used in the process. In either of the above embodiments, the controller/power supply used for the deposition process can control the deposition current level so as to not exceed an acceptable current level for any one ground point. That is, at the beginning of a build process, if only one ground point 1651 is being used, the current is controlled such that the current level does not exceed an acceptable level for a single ground point 1651. To do so could cause damage to the ground point. However, as the build proceeds to additional ground points, the controller can cause the current level to rise because of the additional ground points contacted—because an increased number of ground paths to the conductor 1670. Therefore, in such embodiments, because the controller knows the location of each of the ground points, the controller can then increase the current as multiple ground points are utilized. In such embodiments, the deposition current can be increased incrementally with the contact of each respective ground point, or can be increased in a single step when a suitable number of ground points is contacted. For example, for a deposition current of 200 amps the controller can determined (using stored information) that a minimum of 4 ground points are needed for such a current level. The controller/power supply can utilize a first, lower, current level (e.g., 50 amps) until at least 4 ground points are contacted, at which time the deposition current is increased to the optimal level. In other embodiments, the current can be increased in increments as each new ground point is contacted until the minimum needed ground points are contacted. For example, the current can increase by 50 amps for each subsequent ground point, until the desired deposition current level is reached. The current increase steps can be predetermined/preprogrammed in the controller of the system.

In exemplary embodiments of the present invention, the ground points are wires or pins having an average diameter which is larger than that of the wire diameter used. In exemplary embodiments, the ground points are pins having an average diameter of at least 20% larger than the largest wire diameter used. In some exemplary embodiments, the diameter is in the range of 20 to 80% larger than the diameter of the largest diameter wire. Further, as shown in FIG. 17C the pins can have a larger head area—as shown—for additional contact with a workpiece. That is, the pins can have a larger head area (e.g., like a nail, etc.) at the contact surface of the substrate—see, e.g., FIG. 17C. To the extent the pins 1651, etc. have a shape as shown in FIG. 17C, the larger head area is not considered in determining the average diameter of the pin as discussed above.

In further exemplary embodiments, the ground points 1651, etc. (e.g., pins, wires, rods, etc.) are removable and replaceable within the substrate 1600. For example, as shown in FIG. 17C, the pins simply rest in holes in the substrate and act as the ground points described above. Through admixture the pins become secured to the workpiece as its built, and then upon completion the workpiece is removed, along with the secured pins. Then, the pins/rods, etc. can be removed via a machining process and new pins can be replaced in the substrate 1600 for the next process. The removable pins 1651, etc. should be of a sufficient length so as to make contact with a workpiece being built on the substrate and the contact plate 1670, so that a proper ground current path can be made.

Figure 18A:
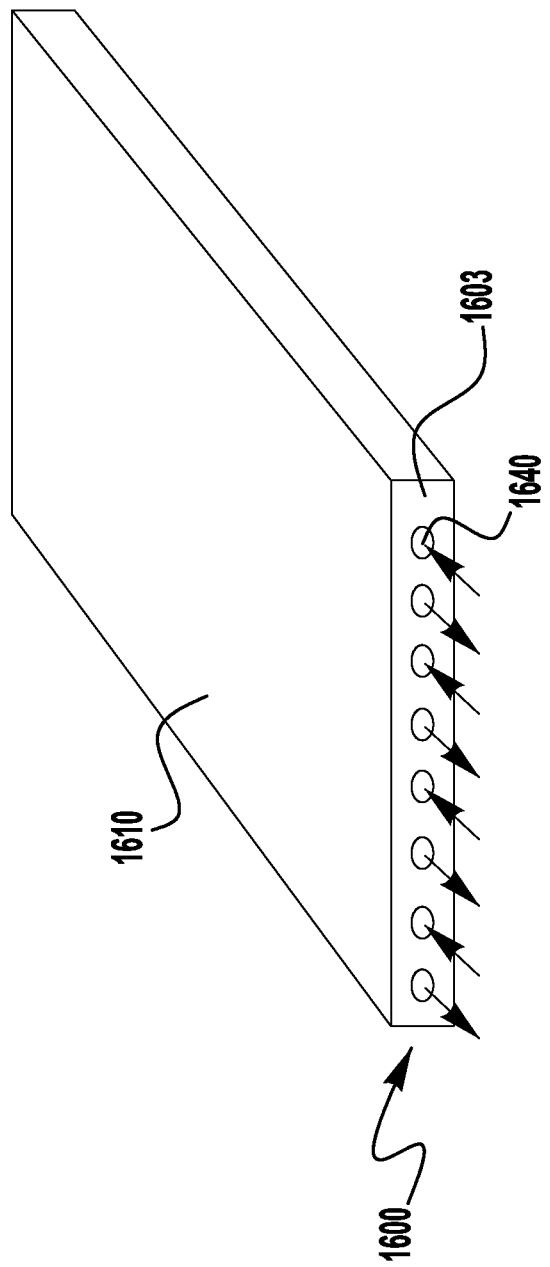
FIG. 18A illustrates an embodiment of a non-bonding substrate having a cooling system.

FIG. 18A depicts another exemplary embodiment of the present invention, where the substrate 1600 contains at least one cooling channel 1640 through which a cooling medium can be passed during manufacture of a workpiece, or at least during the initial manufacture of a workpiece. The cooling medium can be a gas or a liquid and is used to keep the substrate at a temperature such that no portion of the surface 1610 melts, or is otherwise adhered, to a workpiece. By cooling the substrate 1600 via the use of a cooling manifold/channel 1640, the surface 1610 can be kept cool, and any electrically conductive materials on the surface 1610 (e.g., lattice structure, conductive particles, etc.) can be kept cool so that any layer of the workpiece formed on the surface 1610 will not melt, or otherwise bond with the electrically conductive components on the surface 1610. Other embodiments, can use other cooling methods/processes without departing from the scope or spirit of the present invention. For example, passive heat pipes can be used.

Thus, in exemplary embodiments, a substrate is provided which provides the needed electrically conductivity but also provides a non-bonding surface such that the removal and processing of the workpiece after manufacturer is easier.

Figure 18B:
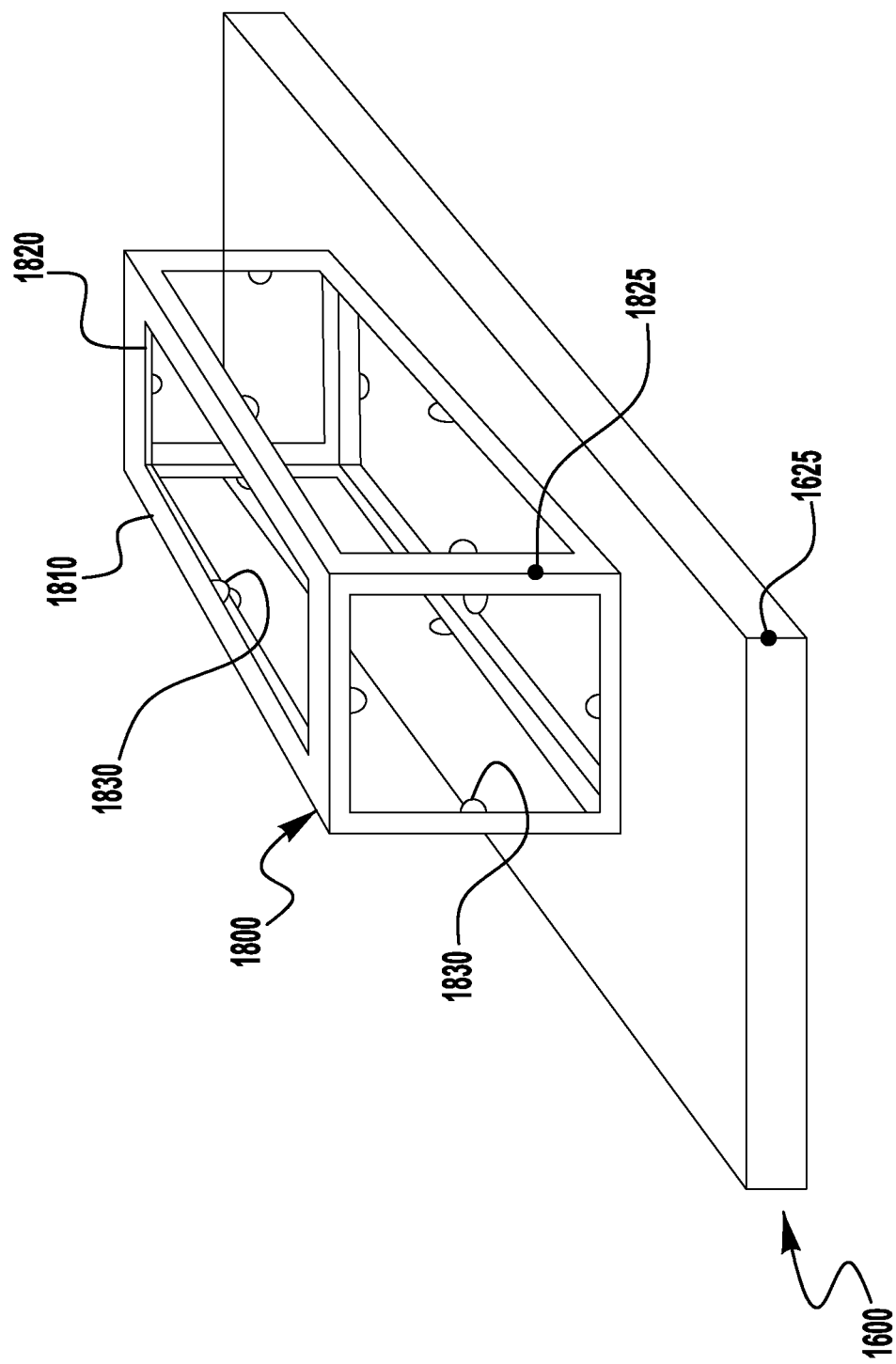
FIG. 18B illustrates an exemplary embodiment of a manufacture truss structure that can be used with embodiments of the present invention.

FIG. 18B depicts yet another structure that can be used with the exemplary additive manufacturing processes described herein. The additive manufacturing processes described herein can be used to manufacture complex and delicate workpieces. The easy manufacture of components such as these can be aided by starting the manufacturing process from a non-horizontal traditional substrate or work surface. For example, it may be advantageous to manufacture the workpiece in a hanging configuration. That is, it may be easier to manufacture the workpiece where the initial layers/deposition of the workpiece layers are hanging such that they extend from a bottom of a substrate—as opposed to a traditional bottom up, flat surface substrate. The embodiment shown in FIG. 18B depicts an exemplary truss structure 1800 which can be used in these situations. The truss structure 1800 can have a plurality of support components 1810 and 1820 which are electrically coupled to each other—to allow for current flow. The truss structure 1800 is configured such that a workpiece can be started at any point on the structure 1800 as desired for a given workpiece. For example, if it is easier to manufacture a workpiece upside down, or from a top down process, the part can be started at a point on one of the members 1810 and 820 and built downward by the processes described herein. Of course, the truss structure and the torch/contact tips being used should be designed such that the tips can be properly positioned in the truss structure 1800. The part can then be built from the structure 1810/1820 down to the surface of a substrate 1600 as needed. As shown the truss structure 1800 can have its own ground contact point 1825, or can simply be electrically conductive throughout. Further, in some exemplary embodiments, the truss structure can have contact protrusions 1830 to which the beginning of a part or workpiece is secured to start a build operation. These protrusions 1830 act as contact nodes to which the beginning of a workpiece is started. These protrusions can make it easier to begin a manufacturing process and can make it easier to separate the final part from the truss structure—without damaging the manufactured part. The protrusions 1830 can be made integrally with the parts 1810/1820 of the structure 1800. In other embodiments, the protrusions 1830 can be made of a different material and/or be easily separable from the structure. For example, the protrusions 1830 can be pins or other fastener type components having a head or protrusion portion to which a part can be secured and started for a manufacturing process. Upon completion the pins can be removed from the truss structure allowing for easy removal of the manufactured part. The truss structure 1800 can take any desired shape or configuration for a given manufacturing process.

In exemplary embodiments, the truss structure 1800 can be a metallic structure that allows for the transfer of the current to the substrate 1600—which can be any of the embodiments described above. In other exemplary embodiments, the truss structure can be made of a non-bonding, but conductive material, as generally described above with respect to FIGS. 16 and 17. In any event, the structure 1800 should be constructed such that it can provide a current path to either the substrate 1600 or a ground point 1825 to allow for the proper flow of the heating current.

FIGS. 19A, 19B and 19C depict exemplary embodiments of an additive manufacturing consumable 1900 that can be used with embodiments of the invention described herein. It is generally understood that large diameter solid consumables require more current/energy to melt the consumable. However, smaller diameter consumables require less current/energy to melt, such that a lesser amount of current/energy is needed to melt a plurality of smaller diameter consumables that have, collectively, the same cross-sectional area as a single larger diameter solid wire. Thus, the consumable used in some exemplary embodiments of the present invention is a braided consumable 1900 made up from a plurality of wires 1903 which are braided. In some embodiments, the wires 1903 are the same, having the same diameter and composition. However, in other exemplary embodiments, the wires 1903 can be different from each other. For example, in some embodiments, two different wire types can be used to make the braided consumable 1900. In such an embodiment, the wires can different based on diameter and/or composition. For example the center wire can have a first diameter and composition and the perimeter wires 1903 have a second diameter and composition, both of which are different than the first diameter and composition. This allows for the use of a consumable 1900 that has customized properties for a particular manufacturing process. It should be noted that the methods and systems described herein to deposit solid or cored consumables can be used to deposit a braided consumable such as that shown in FIG. 19A.

Further, in the embodiment shown in FIG. 19A, the center wire 1903' is a non-braided wire, and the outer perimeter of wires 1903 are braided around the center wire 1903'. The braid can be made in a generally helical pattern along the length of the consumable 1900.

In some exemplary embodiments, the braiding of the consumable 1900 can be used to increase the relative wire feed speed of a consumable type. For example, as shown in FIG. 19A the center consumable 1903 can be of a first type/material, and the surrounding wires 1903 can be of a different type/material. Because the length of the surrounding (outside) wires is longer than the center wire, for a given length of the consumable 1900 the effective deposition rates of each of the respective wire types are different. The effective, relative deposition rate of different wires types can also be affected by the relative number of wire types in a given bundle. Thus, embodiments of the present invention allow for increased flexibility in the deposition chemistry.

FIGS. 19B and 19C depict another exemplary embodiment of a consumable that can be used with embodiments of the present invention. However, unlike the consumable 1900 in FIG. 19A, the consumables 1900 in FIGS. 19B and 19C have a void 1910 at the core of the consumable, where the core 1910 is surrounded by a plurality of braided wires 1903. This hollow consumable construction allows the consumable 1900 to be squeezed and "shaped" during deposition so as to allow the deposition process to be customizable. This will be explained in more detail below.

The braiding of the wires 1903 which form the exterior of the consumable 1900 is done in a general helical pattern, similar to known wire braiding methodologies, but a void 1910 is maintained at the core of the consumable 1900. Like in FIG. 19A, the wires 1903 can have the same diameter and composition in some embodiments, while in other embodiments the wires 1903 can have different properties. An example of this is depicted in FIG. 19C, where the braiding includes a first wire type 1903 having a first diameter and composition, and a second wire type 1905 having a second diameter and composition. Of course, in some embodiments, even though the diameters of the wires 1903/1905 are different, the compositions can be the same. As shown in FIG. 19C, the different wires 1903/1905 alternate around the perimeter of the cross-section of the consumable 1900. In further exemplary embodiments, the wires 1903/1905 can have different melting temperatures which can provide for customize deposition profiles and layering, as needed.

The void 1910 should be dimensioned such that the consumable 1900' remains relatively stable in the deposition process. If the void is too large, the consumable can become unstable and will not maintain its integrity in the deposition process. In exemplary embodiments, the diameter of the void 1910 is in the range of 5 to 40% of the effective diameter of the consumable 1900'. The "diameter of the void" 1910 is the diameter of the largest circular cross-section that can be fit within the void 1910—as shown in FIG. 19C as the dashed circle. The "effective diameter" of the consumable 1900' is the diameter of a circle having the same cross-sectional area of the combined cross-sectional area of all of the wires 1903/1905 that make up the consumable 1900'.

As indicated above, the consumable 1900 having a center void 1910 can be shaped during the deposition process to allow for changing of the deposition characteristics of the consumable. This is generally depicted in FIGS. 20A and 20B, where the consumable 1900 has been squeezed in a direction relative to the travel direction of the consumable to achieve the desired width of the deposition. As described herein process and systems of the present invention can be used to make complex shapes via additive manufacturing. Thus, workpieces and shapes having varying thicknesses, etc. can be made. The consumable 1900 shown in FIGS. 19B and 19C allow these complex shapes and differing thicknesses to be easily made due to the void. In FIG. 20A the consumable is squeezed in a direction normal to the travel direction which narrows the consumable 1900 relative to the travel direction. By doing this, the resultant deposition will be narrower than the original diameter of the consumable. Similarly, FIG. 20B depicts the same consumable 1900 being squeezed in a direction along the travel direction, which results in widening the consumable 1900 relative to the travel direction. As such, with such squeezing a wider deposit can be made as needed. As stated above, the void 1910 should be of a size/diameter that allows for the deformation of the consumable 1900 to change its relative width as compared to its non-compressed state.

In some exemplary embodiments, the void 1910 can be filled with a flux or powder of a desired chemistry that is needed for the deposition. This can aid in delivering a desired material to the build that is not easily made into wire, or transferable through the melting of the wire. For example, an abrasion resistant powder can be added as a flux.

Figure 20C:
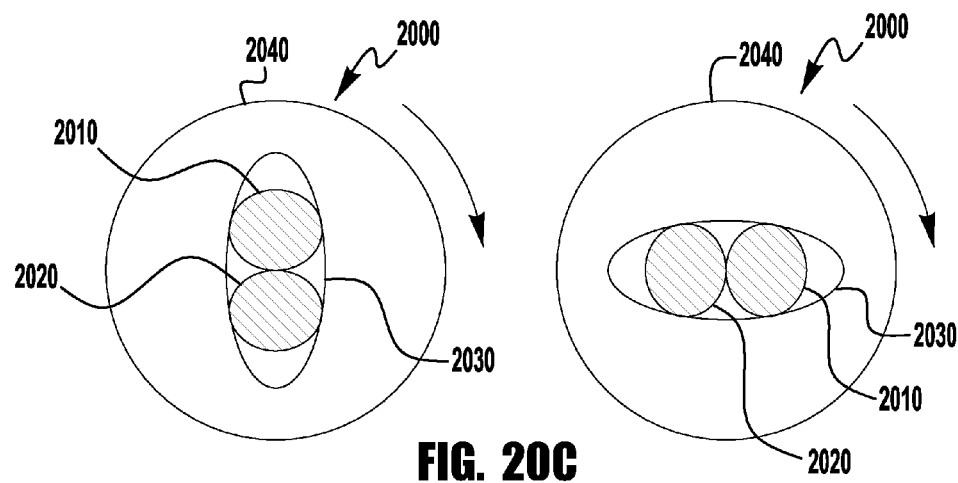
FIG. 20C illustrates an embodiment of a dual wire deposition contact tip assembly as described herein.

FIG. 20C depicts another exemplary embodiment of a contact tip assembly 2000 and consumable delivery system and method that can be used with embodiments of the present invention. In this embodiment, at least two consumables 2010 and 2020 are directed to the contact tip assembly 2000 and the contact tip 2040, which has an orifice 2030 that allows both consumables to pass through. Unlike the above embodiments, the consumables 2010 and 2020 are not braided. They can be delivered from the same consumable source (spool, reel, etc.) or can be delivered from separate sources. Further, they can be the same consumable, having the same dimensions and composition, or can be different as desired for a given manufacturing operation. In further exemplary embodiments, the consumables 2010 and 2020 can be fed at different rates, and in some embodiments, the feed rates can be changed "on the fly" during a deposition process. Such embodiments, allow for the customization of alloys for the build during the deposition process. For example, during a first portion of the process the consumables 2010 and 2020 are fed at the same rate, but at different stages of the build process the consumable 2010 is slowed down or sped up as needed to create the desired deposit chemistry.

Further, while two consumables are shown, other embodiments can use three or more as needed. In the embodiment shown, the consumables 2010 and 2020 are delivered to the orifice 2030 (which can be oval shaped, or any other shape to accommodate the consumables) and are then directed to the workpiece as with known consumable delivery systems. During deposition, the contact tip 2040 is oriented such that the consumables provide the desired deposition profile. Further, the contact tip 2040 is rotatable (as above described embodiments) to allow the consumables to be oriented as designed and have the shape or profile of the deposition process to be changed as desired. For example, as shown, the orientation on the left shows an in-line orientation which will provide a narrow deposit on the workpiece, but with an increased height as the consumables are in-line in the travel direction. Then, as needed, the contact tip 2040 can be rotated to the position shown on the right. The rotation can be effected by the controller 195 and motors, etc., and can be used during changes in deposition direction, without the need to change the orientation of the torch. The positioning on the right can be used when it is desired to increase the width of the deposit—in the travel direction. It is also noted that in some embodiments, it may not be necessary to feed both consumables 2010 and 2020 at the same time. In such embodiments, the consumables 2010 and 2020 would be fed by separate wire feeders (not shown) and the controller 195 can control which one of the consumables is being fed, or whether they are fed at the same time. In such embodiments, the consumable not being fed need not be withdrawn from the orifice 2030 and can thus be used to maintain the positioning of the consumable which is being fed. In such embodiments, the feeding of the consumables can be controlled by the controller 195—which will feed either one, or both, of the of the consumables as needed at a given moment during the process.

Figure 20D:
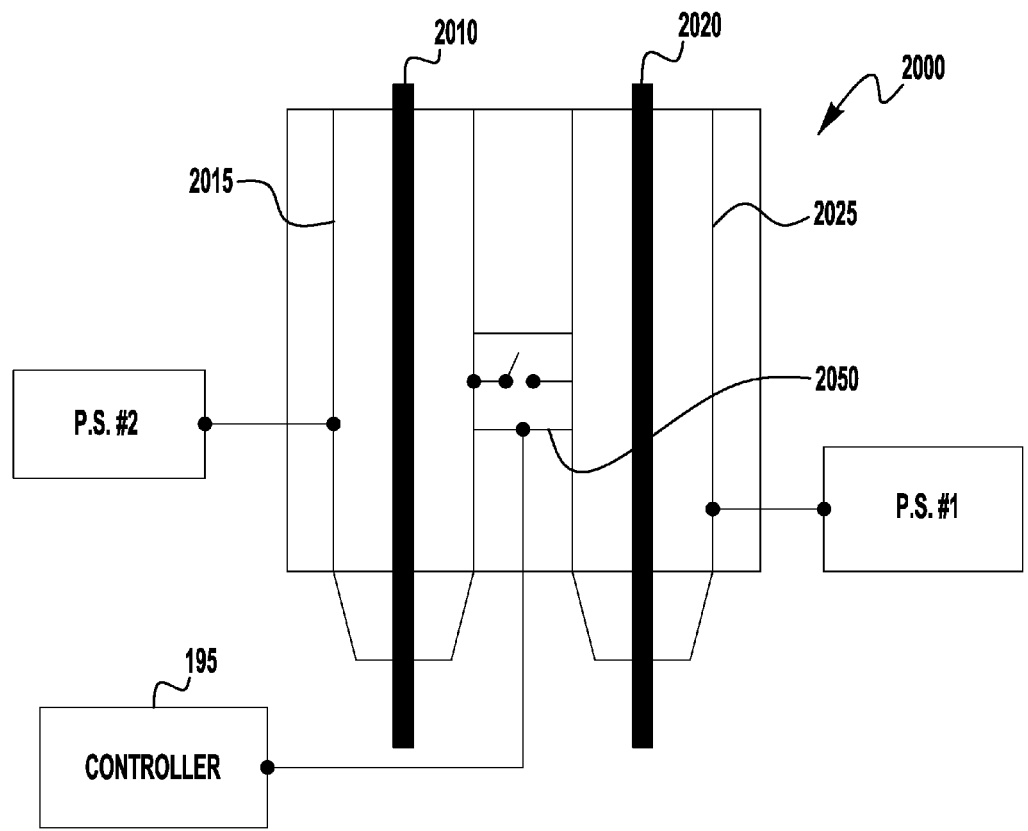
FIG. 20D illustrates a further exemplary embodiment of a dual wire contact tip of the present invention.

Further, in the embodiment shown in FIG. 20C, each of the consumables 2010 and 2020 are sharing the same current, as they are being directed through a single orifice 2030. In such embodiments, the current can come from a single power source, and the current is shared by each consumable. However, FIG. 20D depicts a different exemplary embodiment. In the embodiment shown in FIG. 20D the contact tip assembly 2000 contains two electrically isolatable contact tip portions 2015 and 2025. The tip portions 2015 and 2025 deliver the consumables 2010 and 2020, respectively. However, the assembly 2000 contains a switching device or mechanism 2050 which can electrically couple the tip portions 2015 and 2025 to each other such that they share a current, or can electrically isolate the tip portions from each other. In an exemplary embodiment, each of the tip portions 2015 and 2025 are coupled to a separate power supply (PS#1 and PS#2). When the switch 2050 is in an open position, each respective power supply can provide a separate and distinct heating current to the respective consumables. In such embodiments, the consumables can be deposited at different rates, and or can be different in size and composition. This can be controlled and used as similar embodiments described above using multiple consumables. However, in this embodiment, as needed the controller 195 can close the switch, at which time the contact tip portions 2015 and 2025 become electrically coupled and can share a single current signal from one of the power supplies P.S. #1 or P.S. #2. In such embodiments, it may only be needed to run a single power supply for a given operation, to reduce power usage and or eliminate the need for synchronizing signals. In such embodiments, the switch 2050 can be closed such that each of the tip portions 2015 and 2025 can now be coupled to each other so that the consumables 2010 and 2020 share the same signal from a single source. When the switch 2050 is opened the tip portions are electrically isolated from each other (via a dielectric material or other appropriate means), and if both consumables are to be deposited they would receive separate signals from separate power supplies. Alternatively, at some point during a deposition operation it may be only needed that a single consumable need be deposited. Thus, only one power supply is operated, but the switch 2050 is opened to isolated the other consumable for safety purposes. The switching mechanism 2050 can be any switch structure which is capable of isolating and connecting the tip portions 2015 and 2025, and can be integral to the tip assembly 2000, or can be remote from the assembly 2000, as desired.

Figure 21A:
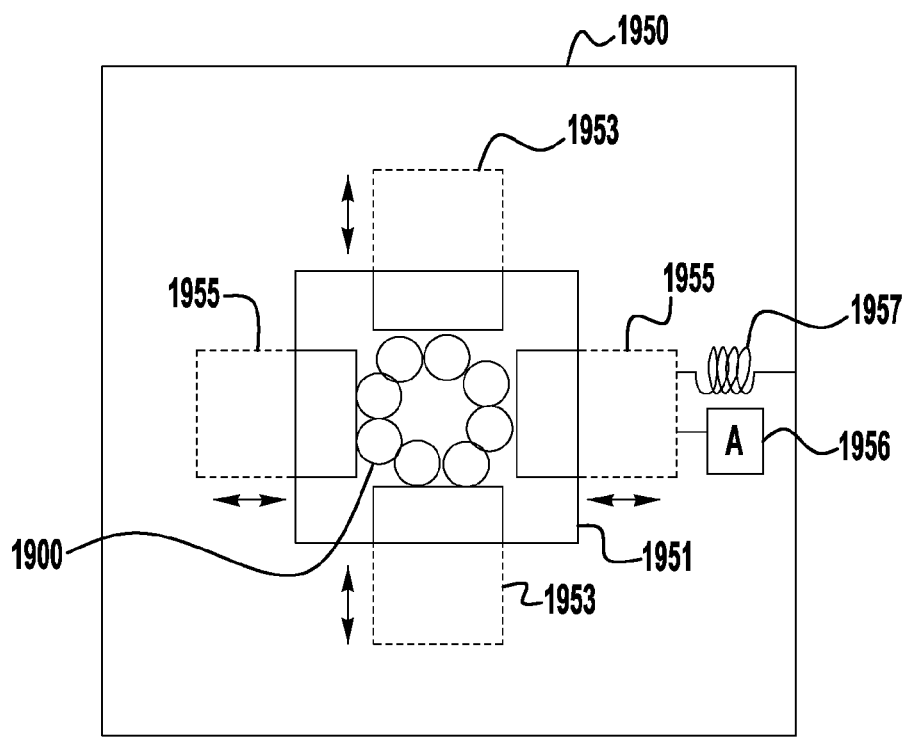
FIGS. 21A and 21B illustrate an exemplary contact tip assembly of the present invention that can be used to deform consumables for delivery during a deposition process.
Figure 21B:
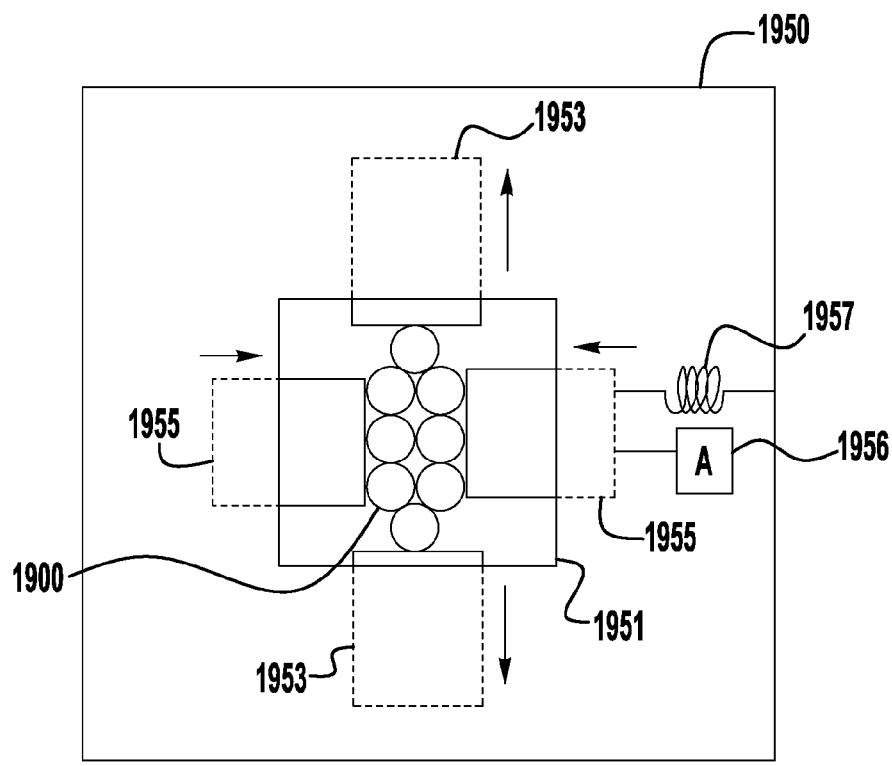

Turning now to FIGS. 21A and 21B, a diagrammatical view of a representative contact tip assembly 1950 is shown using the consumable 1900 of FIG. 19B. FIGS. 21A and 21B show a view looking up at the exit portion of the contact tip assembly 1950, where FIG. 21A depicts the consumable in a non-compressed state and FIG. 21B depicts the consumable 1900 in a compressed state. It should be noted that the following description of the contact tip assembly 1950 is intended to be exemplary and those of skill in the art understand that other configurations and designs can be used to shape the consumable 1900 as desired to achieve the desired deposition during an additive manufacturing process.

As shown, the contact tip assembly 1950 has a consumable opening 1951 through which the consumable passes. While the opening 1951 is shown as square, embodiments of the present invention are not limited in this regard and other shapes can be used so long as the consumable 1900 can pass through in both its compressed and non-compressed state. In the embodiment shown, the assembly 1950 has two pairs of contact plungers 1953 and 1955. The plungers are movable relative to the opening 1951, as shown, such that they can extend into the opening and thus apply a compression force on the consumable 1900. The contact plungers 1953 and 1955 are oriented such that one pair of plungers 1953 are moveable in a direction normal to the direction of movement of the other set of plungers 1955. Thus, as shown in FIG. 21B the plungers 1953/1955 can squeeze the consumable 1900 in a desired direction to attain the desired shape. Each set of plungers can be moved via known actuation devices 1956, such as linear actuators, etc. and can be controlled by the controller 195 (not shown in these figures). Further, each of the plungers 1953/1955 are configured to provide the heating current waveform to the consumable 1900 such that the heating current is delivered to the consumable 1900 via the plungers. It is noted that although one actuator 1956 and bias 1957 are shown in the Figures, exemplary embodiments would have similar components for each of the plungers.

As shown in FIG. 21A, during a non-compressed state, each of the plungers 1953/1955 make contact with the consumable 1900 to deliver the heating current. The plungers 1953/1955 are held at a position, relative to the opening 1951, to ensure that consumable 1900 is maintain in its natural state. Then, during deposition, it is determined (for example, by the controller) that a width of the consumable should be changed to achieve a desired deposition configuration—either the consumable should be made wider or narrower, as needed. Based on this information, the controller 195 causes the plungers 1955 to be actuated (via actuators 1956) and moved inward to compress the consumable 1900 as shown in FIG. 21B. Additionally, to accommodate the change in shape of the consumable 1900 the plungers 1953 are withdrawn to allow the shape of the consumable to change. However, in exemplary embodiments, the withdrawn plungers 1953 still make contact with the consumable 1900 to hold the consumable 1900 at the proper position and to deliver the heating current.

During the deposition process, the shape of the consumable 1900 can be changed "on the fly" by moving the plungers to achieve the desired shape. For example, the controller 195 can control the plungers 1953/1955 to retract and extend as needed during the deposition to change the shape of the consumable 1900 to go from a wide deposition to a narrow deposition and back again, without stopping the deposition process.

As stated above, the movement/actuation of the plungers 1953/1955 can be effected by any known actuators, movement devices to effect the desired motion. In some exemplary embodiments, (not shown here) each plunger in the respective pair of plungers can be mechanical linked to each other such that their relative motions are maintained consistent with each other. In such embodiments, rather than having a separate actuator for each plunger, a single actuator can be used for each respective pair, and because of a mechanical linkage each of the plungers will move appropriately.

Further, as indicated above, the controller 195 can control the actuation of the plungers based on a desired shape to be constructed. In further exemplary embodiments, the assembly 1950 can be rotated as desired during the deposition operation to achieve a desired shape. That is, the assembly 1950 can be coupled to a rotation motor and/or robotic arm (or other similar motion device) and the controller 195 (or other system controller) can cause the assembly to rotate as needed, and have any of the plungers activated to achieve the desired consumable, and thus deposition, shape.

Figure 22:
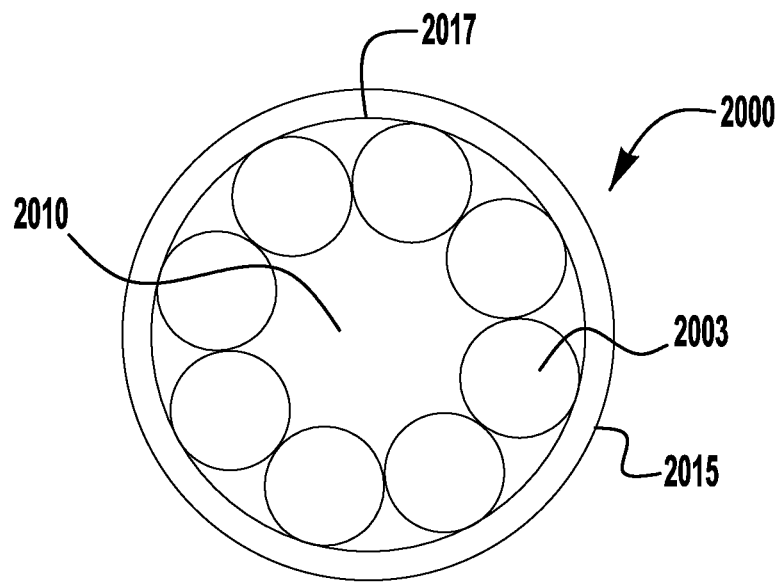
FIG. 22 illustrates another exemplary consumable of the present invention.

FIG. 22 depicts another exemplary embodiment of a consumable 2000 that can be used with exemplary embodiments of the present invention. The consumable 2000 includes a similar braided structure of wires 2003 with a space 2010 as described above, but also includes a sheath 2015. The sheath 2015 can be constructed and formed similar to known sheath structures used for welding or brazing consumables. As shown, in this embodiment, the sheath 2015 complete encloses the wires 2003 and has a seam 2017, which is a butt seam. The sheath 2015 can be made of any material desired to deposited on the work piece. In some embodiments the sheath 2015 can be the same material as the wires 2003, while in other embodiments the sheath can be made of a different material/have a different composition. The sheath 2015 can also aid in the consumable 2000 maintaining its shape after it is reformed by the plungers in the contact tip assembly of FIGS. 21A and 21B. Specifically, the squeezing of the wire through the orifice 1951 will cause the sheath 2015 to plastically deform, thus causing the consumable 2000 to hold the desired shape more easily. This can allow for the stick out of the consumable 2000 to be increased during a deposition process.

Figure 23:
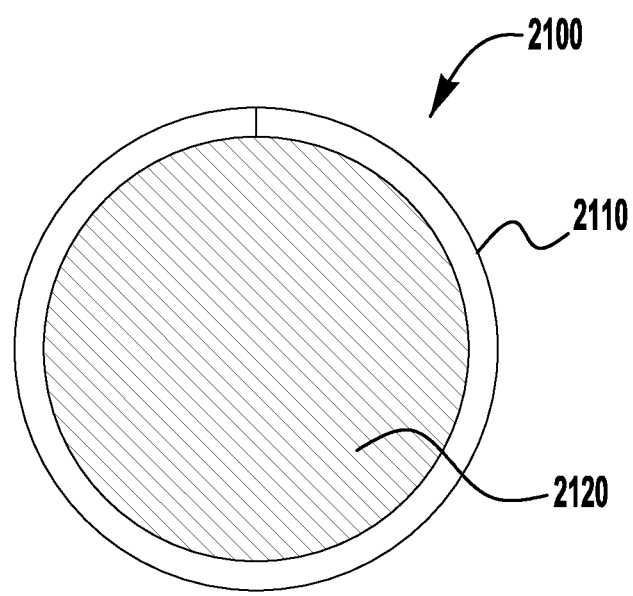
FIG. 23 illustrates a further exemplary embodiment of a consumable for additive manufacturing as described herein.

FIG. 23 depicts another exemplary consumable 2100 that can be used with embodiments of the present invention. The consumable 2100 contains a sheath 2110 and a core 2120, where the sheath 2110 has a lower melting temperature than the core 2120. By having such a divergent melting temperature, embodiments of the consumable 2100 can provide increased control over the manufacturing of a component. In embodiments where the consumable melts at the generally same temperature throughout, the dynamics of the molten puddle created play an important role in the deposition and build process. In certain instances the controlling of the puddle can be difficult, particularly in high precision manufacturing processes, or where the thickness of the workpiece being constructed is very thin. In such applications the puddle dynamics can be hard to control and account for. However, when using the consumable 2100 the sheath 2110 melts prior to the core 2120. The molten sheath material then provides a molten matrix to adhere the core material to the workpiece. In such applications the importance of the puddle is decreased and in some instances, the puddle can be eliminated. Further, in alternative embodiments, the size and/or depth of the puddle can be reduced as the puddle and molten sheath material will work together to adhere the core material to the workpiece. As such, the dynamics of the puddle can be less important when using the consumable 2100.

In exemplary embodiments the core 2120 can be a solid core, while in other embodiments the core 2120 can be powder or particles of a desired material. In such embodiments, the consumable 2100 can be shaped (as discussed above) to achieve a desired deposition. That is, because the core 2120 can be powder or granular, the exterior of the consumable 2100 can be shaped and squeezed to achieve a desired consumable profile. In additional embodiments the consumable can be constructed like that shown in at least FIG. 22, where the sheath surrounds a plurality of individual wires, and where at least some (or all) of the wires 2003 have a melting temperature which is higher than the sheath 2015. In fact, in some of such embodiments, the wires 2003 can have different melting temperatures relative to each other. For example, a first number of the wires 2003 can have a first melting temperature (higher than the sheath melting temperature) and a second number of the wires 2003 can have a melting temperature which is either higher or lower than the melting temperature of the first number of wires 2003. Such embodiments can provide increased flexibility in the melt and build profile of the consumable. Further, in some embodiments the heat source (e.g. laser) and/or current are controlled such that at least some of the core 2120 is also melted during the deposition process. However, in other embodiments, the material of the core 2120 is not melted during the deposition process. That is, the sheath 2110 is melted, and the liquid sheath material is used to secure the unmelted core material to the workpiece. In such embodiments, the workpiece is created in layers, alternating between the molten sheath material and the core material. It is noted that although FIG. 23 depicts the consumable 2100 as having a circular cross-section, embodiments of the present invention are not limited in this regard. The consumable 2100 can also have any desired shape which benefits the construction of the workpiece as desired. For example, the consumable 2100 can have a square, rectangular, polygonal, or elliptical cross-section. Of course, other shapes can be used as well.

In exemplary embodiments, the materials of the sheath 2110 and the core 2120 are selected such that the sheath 2110 melts at a temperature which is in the range of 5 to 45% lower than that of the core material. In further exemplary embodiments, the melting temperature of the sheath 2110 is in the range of 10 to 35% lower than that of the core material. Of course, the exact composition of the materials for each of the sheath and the core are to be selected based on the desired composition and construction of the workpiece being built.

Figure 24A:
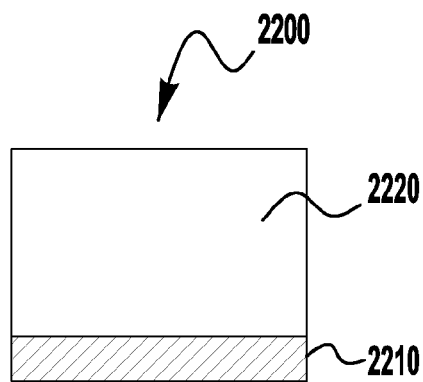
FIGS. 24A to 24D illustrates additional exemplary embodiments of additive manufacturing consumables that can be used with embodiments of the present invention.
Figure 24B:
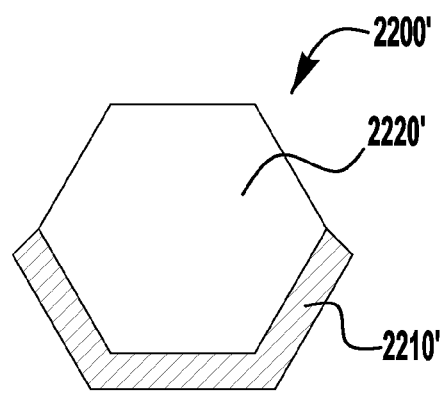
Figure 24C:
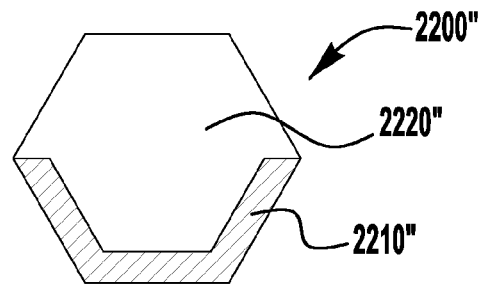

FIG. 24A depicts another exemplary embodiment, where the consumable 2200 has a non-circular cross-section and the sheath material 2210 does not extend around the entire perimeter of the consumable 2200. That is, the consumable 2200 has an asymmetric cross-section. For example, in the embodiment shown the sheath material 2210 is only position on one side of the core material 2220 of the consumable. FIG. 24B depicts another such exemplary embodiment, where the overall shape of the consumable is an hexagon and the sheath material 2210' covers only 5 sides of the hexagonal cross-section of the core 2220'. Of course, other shapes and coverages can be used based on the desired performance and deposition properties of the consumable. FIG. 24C is another exemplary embodiment, which shows a consumable 2200" having a symmetric cross-section, but the distribution of the sheath material 2210" and the core material 2220" is not symmetrical. This configuration allows the consumable to be used with contact tips and equipment designed for typical symmetric consumables, but the consumable itself is asymmetric. In such embodiments, the sheath material 2210 melts and provides adhesion for the core portion 2220 of the consumable, but does not melt from all around the consumable. In such embodiments, the consumable can be oriented as desired prior to adhesion during the deposition process. The sheath material acts as an adhesion material which binds or bonds the core material to the workpiece. Further, in such embodiments, the current/heat input is controlled to ensure the desired melting of the sheath material is attained without fully melting the core material.

Figure 24D:
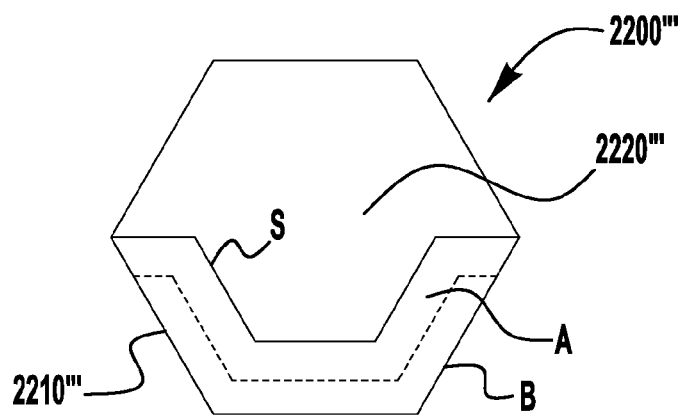

FIG. 24D is a further exemplary embodiment of a consumable 2200''' that can be used with embodiments of the present invention. The consumable 2200''' is similar to those discussed above, except that the sheath layer 2210''' has a layered construction. In such embodiments, the sheath layer 2210''' can be either a solid material or can be a flux. In fact, in any of the embodiments, discussed above, the sheath layer can be a flux, and not be a solid metallic sheath. In those embodiments, in some applications, it may be desirable to place a material within the flux sheath that should not be melted during the deposition process (or the melting is to be minimized). To achieve this, some embodiments use a layered sheath/flux 2210''' where the composition of the flux against the surface S of the core 2220''' is different than the chemistry of the flux at the outer edge of the flux. This is shown in FIG. 24D as layers A and B, where layer A has a first composition and layer B has a second composition. The creation of these layers can use known deposition techniques, which need not be discussed herein. This type of construction allows materials in the layer B to be removed from direct heat in the core 2220''' which would otherwise melt components in the layer B. For example, it may be desirable to deposit tungsten carbide in the puddle, which could be susceptible to melting if they were in direct contact with the core 2220'''. In this embodiment, the layer A acts as a heat buffer, allowing the materials of layer B to be deposited with little or no melting. Of course, it should be understood that the delineation between the two layers A and B need not be a clear, precise line, but can be a transition from one composition to another. Further, the shape and relative cross-sectional area of the layer B, relative to the layer A, can be determined based on the desired composition of the application. FIG. 24D is shown as an exemplary embodiment and other shapes and configurations can be used without departing from the spirit or scope of the present invention.

A user interface coupled to a computer illustrates one possible hardware configuration to support the systems and methods described herein, including the controller 195, or similar system used to control and/or operate the systems described herein. In order to provide additional context for various aspects of the present invention, the following discussion is intended to provide a brief, general description of a suitable computing environment in which the various aspects of the present invention may be implemented. Those skilled in the art will recognize that the invention also may be implemented in combination with other program modules and/or as a combination of hardware and software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

The controller 195 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within the computer, such as during start-up, is stored in the ROM.

The controller 195 can further include a hard disk drive, a magnetic disk drive, e.g., to read from or write to a removable disk, and an optical disk drive, e.g., for reading a CD-ROM disk or to read from or write to other optical media. The controller 195 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by a user interface coupled to the controller 195.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program data. The operating system in the computer or the user interface 300 can be any of a number of commercially available operating systems.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display can be employed with a user interface coupled to the controller 195 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from a user interface via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

We claim:

1. An additive manufacturing system, comprising:
a high energy device which irradiates a surface of a work piece with a high energy discharge to create a molten puddle on a surface of said work piece;
a power supply which supplies a heating signal to a consumable where said heating signal comprises a plurality of current pulses and where each of said current pulses creates a molten droplet on a distal end of said consumable which is deposited into said puddle; and
a contact tip assembly having a passage through which said consumable passes and which delivers said consumable to said work piece;
wherein each of said current pulses reaches a peak current level after said distal end of said consumable contacts said puddle,
wherein said heating signal has no current in between said plurality of said current pulses;
wherein said distal end of said consumable is not in contact with said puddle between subsequent peak current levels of said current pulses;
wherein said power supply controls said heating current such that no arc is created between said wire and said work piece during said current pulses; and
wherein said contact tip assembly has at least one moveable component which changes a shape of said consumable prior to delivery of said consumable to said work piece.

2. The system of claim 1, wherein said consumable comprises a plurality of individual wires.

3. The system of claim 2, wherein said consumable has a void at a center of said consumable which is surrounded by said wires prior to said consumable being shaped by said contact tip assembly.

4. The system of claim 1, wherein said contact tip comprises a plurality of movable components which change said shape of said consumable during deposition.

5. The system of claim 1, wherein said contact tip assembly comprises at least one pair of oppositely positioned moveable components which can extend into and retract from said passage to change said shape of said consumable.

6. The system of claim 1, wherein at least some of said heating signal is delivered to said consumable through said at least one movable component.

7. The system of claim 1, wherein said contact tip assembly is rotatable.

8. The system of claim 1, wherein said contact tip assembly comprises two pairs of moveable components which can change said shape of said consumable.

9. An method of additive manufacturing, comprising:
irradiating a surface of a work piece with a high energy discharge to create a molten puddle on a surface of said work piece;
supplying a heating signal to a consumable where said heating signal comprises a plurality of current pulses and where each of said current pulses creates a molten droplet on a distal end of said consumable which is deposited into said puddle;
passing said consumable through a passage in a contact tip assembly;
changing a shape of said consumable within said passage of said contact tip assembly; and
delivering said consumable to said work piece;
wherein each of said current pulses reaches a peak current level after said distal end of said consumable contacts said puddle,
wherein said heating signal has no current in between said plurality of said current pulses;
wherein said distal end of said consumable is not in contact with said puddle between subsequent peak current levels of said current pulses; and
wherein said power supply controls said heating current such that no arc is created between said wire and said work piece during said current pulses.

10. The method of claim 9, wherein said consumable comprises a plurality of individual wires.

11. The method of claim 10, wherein said consumable has a void at a center of said consumable which is surrounded by said wires prior to said consumable being shaped by said contact tip assembly.

12. The method of claim 9, wherein said contact tip assembly uses a plurality of movable components to change said shape of said consumable during deposition.

13. The method of claim 9, wherein said contact tip assembly uses at least one pair of oppositely positioned moveable components which can extend into and retract from said passage to change said shape of said consumable.

14. The method of claim 9, wherein at least some of said heating signal is delivered to said consumable through at least one movable component in said passage.

15. The method of claim 9, further comprising rotating said contact tip assembly during deposition of said consumable.

16. The method of claim 9, wherein said contact tip assembly uses two pairs of moveable components to change said shape of said consumable.

17. An additive manufacturing system, comprising:
a high energy device which irradiates a surface of a workpiece with a high energy discharge to create at least one molten puddle on a surface of said workpiece;
a contact tip assembly which can direct a first wire and a second wire to said work piece at the same time; and
a first power supply which supplies a first heating signal to at least said first wire where said first heating signal comprises a plurality of first current pulses and where each of said first current pulses of said first heating signal creates a molten droplet on a distal end of at least said first wire which is deposited into said at least one puddle; and
wherein each of said first current pulses reaches a peak current level after a distal end of said first wire contacts said at least one puddle,
wherein said first heating signal has no current in between said plurality of said first current pulses;

wherein said distal end of said first wire is not in contact with said at least one puddle between subsequent peak current levels of said first current pulses; and wherein said first power supply controls said first heating current such that no arc is created between said first wire and said work piece during said first current pulses.

18. The system of claim 17, wherein said contact tip assembly has a consumable channel and each of said first and second wires passes through said consumable channel and shares said first heating signal.

19. The system of claim 17, wherein said contact tip assembly comprises a first channel through which said first consumable passes and a second channel through which said second consumable passes.

20. The system of claim 17, further comprising a second power supply which supplies a second heating signal to said second wire where said second heating signal comprises a plurality of second current pulses and where each of said second current pulses of said second heating signal creates a molten droplet on a distal end of said second wire which is deposited onto said workpiece, and wherein said second heating signal is different than said first heating signal.

21. The system of claim 17, wherein said contact tip assembly comprises a first channel through which said first consumable passes and a second channel through which said second consumable passes, and said contact tip assembly further comprises a switch which electrically couples said first channel to said second channel.

22. The system of claim 21, further comprising a second power supply which supplies a second heating signal to said second wire when said switch is in an open position.

* * * * *